United States Patent
Huang et al.

(10) Patent No.: US 12,424,104 B2
(45) Date of Patent: Sep. 23, 2025

(54) MOTION PLANNING FOR AUTONOMOUS VEHICLE DRIVING USING VEHICLE-TO-INFRASTRUCTURE COMMUNICATION

(71) Applicant: PlusAI, Inc., Santa Clara, CA (US)

(72) Inventors: Xiaoyu Huang, San Jose, CA (US); Chaozhe He, Clarence Center, NY (US); Amit Kumar, Sunnyvale, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

(21) Appl. No.: 18/808,069

(22) Filed: Aug. 18, 2024

(65) Prior Publication Data

US 2025/0124786 A1    Apr. 17, 2025

Related U.S. Application Data

(60) Provisional application No. 63/636,090, filed on Apr. 18, 2024, provisional application No. 63/544,425, filed on Oct. 16, 2023.

(51) Int. Cl.
*G08G 1/00* (2006.01)
*B60W 30/02* (2012.01)
(Continued)

(52) U.S. Cl.
CPC ............... *G08G 1/22* (2013.01); *B60W 30/02* (2013.01); *B60W 30/16* (2013.01);
(Continued)

(58) Field of Classification Search
None
See application file for complete search history.

(56) References Cited

U.S. PATENT DOCUMENTS 10,882,521 B2 *   1/2021   Lepp ................. B60W 30/0956
11,094,191 B2 *   8/2021   Iuzifovich ............ G08G 1/0133
(Continued)

OTHER PUBLICATIONS

Huang, Office Action, U.S. Appl. No. 18/808,066, Oct. 23, 2024, 13 pgs.
(Continued)

*Primary Examiner* — Todd Melton
(74) *Attorney, Agent, or Firm* — Morgan, Lewis & Bockius LLP

(57) ABSTRACT

This application is directed to collecting traffic flow data to facilitate vehicle motion planning. A computer system collects, via a plurality of sensors that are positioned on a fixed installation at a road, data of vehicles that are traveling along a road. The computer system determines, according to the data, that the vehicles traveling along the road includes a first vehicle and a second vehicle ahead of the first vehicle, where the second vehicle is beyond a sensing range of the first vehicle. The computer system identifies, from the data, second vehicle data corresponding to the second vehicle, including a location and speed of the second vehicle. The computer system transmits the second vehicle data to the first vehicle such that the first vehicle is enabled to at least partially autonomously drive according to the second vehicle data and additional data collected by first sensors of the first vehicle.

20 Claims, 12 Drawing Sheets

(51) Int. Cl.

| | | |
|---|---|---|
| *B60W 30/16* | (2020.01) | |
| *B60W 30/18* | (2012.01) | |
| *B60W 40/068* | (2012.01) | |
| *B60W 50/00* | (2006.01) | |
| *B60W 60/00* | (2020.01) | |
| *B62D 15/02* | (2006.01) | |
| *G05D 1/43* | (2024.01) | |
| *G07C 5/00* | (2006.01) | |
| *G08G 1/01* | (2006.01) | |
| *G08G 1/052* | (2006.01) | |
| *G08G 1/0967* | (2006.01) | |
| *G08G 1/16* | (2006.01) | |

(52) U.S. Cl.
CPC .... *B60W 30/18159* (2020.02); *B60W 40/068* (2013.01); *B60W 50/0097* (2013.01); *B60W 60/001* (2020.02); *B60W 60/0015* (2020.02); *B60W 60/0027* (2020.02); *B62D 15/0265* (2013.01); *G05D 1/43* (2024.01); *G07C 5/008* (2013.01); *G08G 1/0129* (2013.01); *G08G 1/0141* (2013.01); *G08G 1/052* (2013.01); *G08G 1/096725* (2013.01); *G08G 1/096766* (2013.01); *G08G 1/164* (2013.01); *G08G 1/20* (2013.01); *B60W 2420/403* (2013.01); *B60W 2420/408* (2024.01); *B60W 2420/54* (2013.01); *B60W 2552/00* (2020.02); *B60W 2552/10* (2020.02); *B60W 2552/35* (2020.02); *B60W 2552/40* (2020.02); *B60W 2554/802* (2020.02); *B60W 2554/804* (2020.02); *B60W 2555/20* (2020.02); *B60W 2556/45* (2020.02); *B60W 2556/50* (2020.02); *B60W 2756/10* (2020.02)

(56) References Cited

U.S. PATENT DOCUMENTS

| | | | |
|---|---|---|---|
| 11,537,767 | B2 | 12/2022 | Fuerst et al. |
| 11,620,906 | B2 * | 4/2023 | Hu ................. G05D 1/0212 701/25 |
| 11,645,909 | B2 * | 5/2023 | Xia ................. H04W 4/44 701/117 |
| 11,747,806 | B1 | 9/2023 | Wootton et al. |
| 12,033,495 | B2 * | 7/2024 | Bartkowiak ..... G08G 1/096791 |
| 12,110,035 | B2 | 10/2024 | Fahoum et al. |
| 2013/0138320 | A1 * | 5/2013 | Aso ................. G08G 1/0116 701/96 |
| 2019/0244518 | A1 * | 8/2019 | Cheng ............ G05D 1/0088 |
| 2020/0074852 | A1 * | 3/2020 | Hu ................... G08G 1/0125 |
| 2022/0126864 | A1 | 4/2022 | Moustafa et al. |
| 2022/0340163 | A1 * | 10/2022 | Geraldy ........... B60W 40/06 |
| 2023/0316908 | A1 * | 10/2023 | Kreidieh ......... B60W 60/001 701/1 |
| 2024/0304083 | A1 * | 9/2024 | Gordon ........... G08G 1/0116 |

OTHER PUBLICATIONS

Huang, Office Action, U.S. Appl. No. 18/808,067, Oct. 22, 2024, 16 pgs.

* cited by examiner 900 (Cont'd)

914 Transmit the second vehicle data to the first vehicle. The first vehicle is enabled to at least partially autonomously drive in accordance with the second vehicle data and additional data collected by one or more first sensors of the first vehicle 916 The first vehicle is configured to determine a distance between the first vehicle and the second vehicle based on the second vehicle data and at least partially autonomously drive in accordance with the determined distance

918 Determine, according to the data of the plurality of vehicles, a distance between the first vehicle and the second vehicle. Transmit to the first vehicle information about the distance between the first vehicle and the second vehicle 920 Transmit the information about the distance between the first vehicle and the second vehicle and the speed of the second vehicle as a first $(s, v)$ pair. $s$ represents the distance between the first vehicle and the second vehicle and $v$ represents the speed of the second vehicle 922 The first $(s, v)$ pair is associated with a first timestamp. Determine a series of $(s, v)$ pairs to establish respective distances between the first vehicle and the second vehicle and respective speeds of the second vehicle over a time period. Each $(s, v)$ pair in the series has a respective timestamp

Figure 9B 900 (Cont'd)

924 Transmit an average traffic speed and the distance to the first vehicle. The first vehicle is configured to at least partially autonomously drive in a first trajectory in accordance with the average traffic speed and the distance 926 Transmit the average traffic speed and the distance to the first vehicle as a first ($s\_1$, $v\_1$) pair. $s\_1$ represents the distance from the predetermined position of the road to the first vehicle and $v\_1$ represents the average traffic speed for the respective lane at the predetermined position of the road 928 The first vehicle is configured to autonomously drive according to first data from the first ($s\_1$, $v\_1$) pair and second data from other ($s\_i$, $v\_i$) pairs that are generated based on the additional data collected by the one or more first sensors of the first vehicle. $s\_i$ represents a distance from the first vehicle to an $i^{th}$ object, and $v\_i$ represents a relative speed between the first vehicle and the $i^{th}$ object 930 Prior to transmitting the average traffic speed to the first vehicle, convert a reference frame of the average vehicle speed from a first reference frame corresponding to the fixed installation to a second reference frame corresponding to the first vehicle

Figure 9C 900 (Cont'd)

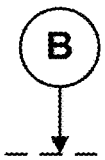

932 The road includes a plurality of lanes. Determine an average traffic speed for each lane, of the plurality of lanes, at a predetermined position of the road ahead of the first vehicle. Transmit to the first vehicle (i) a plurality of average traffic speeds, corresponding to the plurality of lanes, and (ii) the distance from the predetermined position of the road to the first vehicle 934 Transmit to the first vehicle the plurality of average traffic speeds and the distance from the predetermined position of the road to the first vehicle as ($s$, $v\_i$) pairs. $s$ represents the distance from the predetermined position of the road to the first vehicle, and $v\_i$ represents the average traffic speed for an $i^{th}$ lane of the plurality of lanes 936 The first vehicle is configured to at least partially autonomously drive by switching from an ego lane to a lane adjacent to the ego lane in accordance with a determination that a difference between a first average speed corresponding to the ego lane and a second average speed corresponding to the lane adjacent to the ego lane satisfies a first threshold.

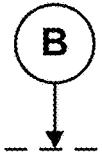

938 Generate a spatial representation representing traffic density on the road in accordance with the collected data. Transmit the spatial representation to the first vehicle

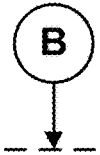

940 Generate, based at least in part on the data of the plurality of vehicles, one or more time series of traffic speed data of one or more lanes of the road corresponding to a predetermined position of the road ahead of the first vehicle

Figure 9D

MOTION PLANNING FOR AUTONOMOUS VEHICLE DRIVING USING VEHICLE-TO-INFRASTRUCTURE COMMUNICATION

RELATED APPLICATIONS

This application claims priority to (i) U.S. Provisional Application No. 63/544,425, filed Oct. 16, 2023, titled "Motion Controlling for Autonomous Vehicles" and (ii) U.S. Provisional Application No. 63/636,090, filed Apr. 18, 2024, titled "Centralized Prediction and Planning Using V2X for Lane Platooning and Intersection Vehicle Behavior Optimizations and Lane Change Decision-Making by Combining Infrastructure and Vehicle Intelligence," each of which is hereby incorporated by reference herein in its entirety.

This application is related to the following applications, all of which are incorporated by reference herein in their entireties:

U.S. patent application Ser. No. 18/808,067, filed Aug. 18, 2024, entitled "Detecting Road and Weather Conditions for Vehicle Driving"; and U.S. patent application Ser. No. 18/808,066, filed Aug. 18, 2024, entitled "Automatic Event Capturing for Autonomous Vehicle Driving."

TECHNICAL FIELD

The present application generally relates to vehicle technology, and more particularly to, methods, systems, and non-transitory computer readable storage media for collecting vehicle traffic data that can be used onboard or offboard to improve decision making in autonomous vehicles.

BACKGROUND

Vehicles are now capable of self-driving with different levels of autonomy. Each of these levels is characterized by the relative amount of human and autonomous control. For example, The Society of Automotive Engineers (SAE) defines 6 levels of driving automation ranging from 0 (fully manual) to 5 (fully autonomous). These levels have been adopted by the U.S. Department of Transportation. Autonomous vehicles provide numerous advantages including: (1) lowering the number of vehicles on the roads, (2) more predictable and safer driving behavior than human driven vehicles, (3) less emissions if there are fewer vehicles on the road, and if they are electrically powered, (4) improved travel efficiency, fuel economy, and traffic safety if they are controlled by computers, (5) increased lane capacity, (6) shorter travel times, and (7) increased mobility for users who are incapable of diving.

There are numerous advantages of autonomous vehicles, including: (1) lowering the number of vehicles on the roads (most privately owned vehicles are driven a small fraction of the time); (2) more predictable and safer driving behavior than human driven vehicles; (3) less emissions if more vehicles are electrically powered; (4) improved fuel efficiency; (5) increased lane capacity; (6) shorter travel times; and (7) mobility for users who are incapable of diving.

One of the key obstacles facing the autonomous vehicle industry is the complexity and unpredictability of road and traffic conditions. It is difficult if not impossible to train autonomous vehicles for every possible rare condition or event that the vehicle may encounter while driving. It is also challenging to plan a route (or motion) of an autonomous vehicles that is uneventful. For example, occasionally, human drivers may need to react to extraordinary or rare events, such as a package falling off a truck or a lane closure. In these situations, human drivers are often able to instinctively react to avoid harm to themselves and their vehicle, but unless the autonomous driving model has been trained for such a rare event, the vehicle may not know how to react.

Currently, autonomous vehicles are equipped with sensors that are primarily used for object (e.g., obstacle) detection. Fleet operators often collect large amounts of data from individual vehicles in order to learn from existing road and traffic conditions. However, these data tend to be limited only to the perception of the individual vehicles.

SUMMARY

Some embodiments of the present disclosure are directed to methods, systems, and non-transitory computer readable storage media for collecting vehicle traffic data to facilitate motion planning of autonomous vehicles to facilitate autonomous vehicle driving. According to some embodiments of the present disclosure, autonomous vehicle motion planning can include longitudinal motion planning and lateral motion planning. Longitudinal motion planning involves determining, for a travel route of a vehicle, a desired vehicle speed of the vehicle at a respective point in time and/or a desired location of the vehicle at a respective point in time while the vehicle travels on the travel route. Lateral motion planning includes determining subsequent movement of the vehicle for maneuvering the vehicle to avoid obstacles.

In one aspect, a method for vehicle motion planning is implemented at a computer system that includes a plurality of sensors that are positioned on a fixed installation at a road. The computer system includes one or more processors and memory. The method includes collecting, via the plurality of sensors, data of a plurality of vehicles that are traveling along a road. The method includes determining, according to the data, that the plurality of vehicles traveling along the road includes a first vehicle and a second vehicle ahead of the first vehicle, wherein the second vehicle is beyond a sensing range of the first vehicle. the method includes, in accordance with the determination, identifying, from the data, second vehicle data corresponding to the second vehicle. The second vehicle data includes a location of the second vehicle and a speed of the second vehicle. The method also includes transmitting the second vehicle data to the first vehicle such that the first vehicle is enabled to at least partially autonomously drive in accordance with the second vehicle data and additional data collected by one or more first sensors of the first vehicle.

In some embodiments, the speed of the second vehicle includes an actual speed of the second vehicle. In some embodiments, the speed of the second vehicle includes an average speed of the second vehicle.

In some embodiments, the method includes determining, according to the data of the plurality of vehicles, a distance between the first vehicle and the second vehicle. Transmitting the second vehicle data to the first vehicle further includes transmitting information about the distance between the first vehicle and the second vehicle.

In some embodiments, transmitting the second vehicle data to the first vehicle includes transmitting the information about the distance between the first vehicle and the second vehicle and the speed of the second vehicle as a first (s, v) pair, where s represents the distance between the first vehicle and the second vehicle and v represents the speed of the second vehicle.

In some embodiments, the method includes generating a spatial representation representing traffic density on the road in accordance with the collected data, and transmitting the spatial representation to the first vehicle.

In some embodiments, the method includes generating, based at least in part on the data of the plurality of vehicles, one or more time series of traffic speed data of one or more lanes of the road corresponding to a predetermined position of the road ahead of the first vehicle.

According to another aspect of the present application, a computer system is associated with a fixed installation at a road. The fixed installation includes a plurality of sensors that are positioned on a fixed installation. The computer system includes one or more processors, and memory coupled to the one or more processors. The memory storing instructions that, when executed by the one or more processors, cause the computer system to perform any of the methods for vehicle motion planning as disclosed herein.

According to another aspect of the present application, a non-transitory computer readable storage medium stores instructions configured for execution by a computer system that includes a plurality of sensors that are positioned on a fixed installation at a road, one or more processors, and memory. The instructions, when executed by the one or more processors, cause the computer system to perform any of the methods for vehicle motion planning as disclosed herein.

In accordance with some embodiments of this application is a realization that certain implementations of vehicle motion planning may be limited in time (e.g., 3 seconds to 30 seconds) and/or distance (e.g., within 10-50 meters). This is largely because current vehicle motion planning relies mostly on data collected by onboard vehicle sensors and tend to be limited only to the perception of the individual vehicles. According to some aspects of the present disclosure, a fixed installation includes an infrastructure having a fixed location at a road, and is equipped with sensors that directly collect information such as traffic flow data and traffic signal data. The fixed installation may be located at a section of a road, a freeway entrance or exit, a lane merge zone, a tunnel, a toll booth, a traffic light area, an on-ramp merge point, and/or a road intersection. Compared to data collected by individual vehicles using vehicle sensors and from individual vehicles' perspectives, traffic information collected by the sensors disposed at the fixed installation tend to be more detailed and instantaneous. The sensors disposed at the fixed installation may be statically (e.g., fixedly or immovably) positioned, have better detection coverage, and focus on a fixed area of a road. Traffic data generated by the sensors associated with the fixed installation tend to more accurate, detailed, and instantaneous compared to data provided by navigation services based on crowdsourced location data. As such, in some embodiments, a mechanism is established based on the sensors associated with the fixed installation to collect, and share with vehicles, information (e.g., traffic flow information and traffic signals information) in an accurate and instantaneous manner so that the vehicles can utilize the information to plan their motion.

As disclosed, in some embodiments, a respective installation can be equipped with a local processing unit that processes raw sensor inputs, generates traffic information based on the sensor inputs, and transmits the traffic information to vehicles that are within a predefined distance of the respective installation. In some embodiments, the vehicle includes onboard sensors and an onboard motion-planning module. The vehicle is enabled to at least partially autonomously drive in accordance with the traffic information and additional data collected by the onboard sensors of the vehicle.

As disclosed, in some embodiments, the traffic information can include real-time information about traffic flow, traffic signal timings, and uncommon incidents. Other examples of traffic information include current traffic speed at one or more locations, current and future states of the traffic signals within a detection range of the sensors, incidents such as vehicle breakdowns, accidents, and/or temporary lane closures that cause unusual slow down at certain locations. As disclosed, compared to data provided by services based on crowdsourced location data, such as traffic maps data provided by existing navigation apps, the traffic information provided by the installation is much more accurate, detailed, and instantaneous, because the sensors on the installations are directed to a fixed field of view of the road. In some embodiments, multiple installations may be provided at different locations along a road, each installation having its respective sensors.

As disclosed, in some embodiments, the processing unit generates and transmits output in the form of time series data, such as traffic speed at a given location over time, or traffic speed associated with individual lanes of a road, at a given location of the road over time. In some embodiments, the processing unit can first generate and transmit output in the form of spatial data such as heat maps representing traffic density within an intersection of a road. Once an anomaly is detected (e.g., unusual traffic congestion, or the detection of special-use vehicles such as on-duty fire trucks) from the spatial data, the time series data of the specific location can be generated (e.g., appended or obtained) and transmitted.

As disclosed, in some embodiments, once the route of a vehicle is determined, the vehicle can actively obtain traffic information from road installations that are positioned along the route as the vehicle is within a predefined range of a respective installation (e.g., 1-2 kilometers, or 1-2 minutes of driving estimated based on current speed and speed limits). In some embodiments, the traffic information is fused and formulated in a way that can be easily incorporated into the onboard motion-planning module of the vehicle. In some embodiments, the traffic information is represented as (s, v) pairs, where s represents a distance along the route from the vehicle to a target point covered by the installation, and v represents a current traffic speed detected by the sensors of the installation at that target point. For example, for a traffic signal, v can be 0 if the traffic light is red. In instances where there are multiple installations along the vehicle travel route, each installation (e.g., processing unit) can provide one or more such (s, v) pairs depending on the road geometry and real-time traffic complexity. The (s, v) pairs that are transmitted to the vehicle (e.g., to the motion planning module of the vehicle) can serve as either target speed or constraints when determining a longitudinal speed profile of the vehicle. In some instances, the (s, v) pairs that are transmitted to the vehicle may also trigger proactive lane changing if an (s, v) profile of a current lane that the vehicle is traveling diverges too much from the (s, v) profile of an adjacent lane.

Accordingly, the systems and/or methods disclosed herein advantageously improve decision making modules in autonomous vehicles. For example, in some embodiments, the traffic information derived from sensors mounted on road installations can be used by a vehicle to determine a more accurate speed profile within a short time and/or distance range. In some embodiments, the vehicle can also extend its planning horizon over a longer distance (e.g., within 100 meters, 200 meters, 500 meters, 1 km or 5 km) and/or a longer span of time (e.g., 15 minutes to an hour) due at least in part on additional traffic information that are beyond a sensing range of the onboard sensors of the vehicle. The vehicle can also facilitate proactive lane changing or merging way ahead of a congested area. The planned vehicle motions can enhance driving safety, efficiency, and comfort for autonomous vehicles. It also improves overall traffic flow efficiency by regulating the flow of traffic through mid-range speed planning and/or measures such as rerouting traffic.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

The accompanying drawings, which are included to provide a further understanding of the embodiments, are incorporated herein, constitute a part of the specification, illustrate the described embodiments, and, together with the description, serve to explain the underlying principles.

FIGS. 9A to 9D provide a flowchart of an example process for planning vehicle motion, in accordance with some embodiments.

Like reference numerals refer to corresponding parts throughout the several views of the drawings.

DETAILED DESCRIPTION

Figure 1:
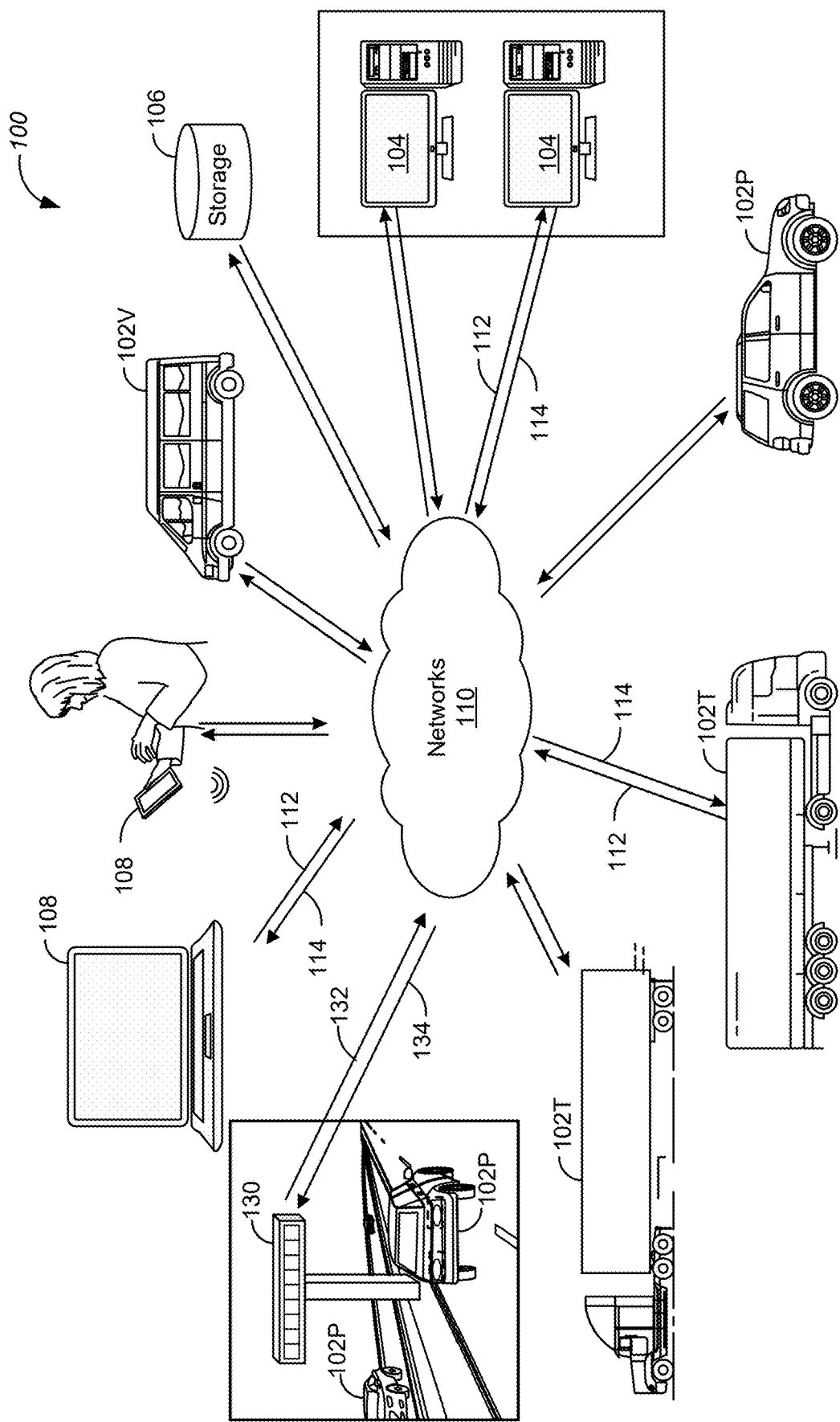
FIG. 1 is an example vehicle driving environment for a plurality of vehicles, in accordance with some embodiments.

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of the claims and the subject matter may be practiced without these specific details. For example, it will be apparent to one of ordinary skill in the art that the subject matter presented herein can be implemented on many types of electronic devices with digital video capabilities.

Various embodiments of this application are directed to collecting traffic information that can be used in onboard decision making by autonomous vehicles for planning vehicle motion. In some embodiments, a computer system includes a plurality of sensors that are positioned on a fixed installation (e.g., an infrastructure) at a road. The computer system includes one or more processors, and memory. In some embodiments, the computer system (e.g., a microcontroller unit) is physically co-located at the fixed installation. In some embodiments, the computer system includes one or more distinct systems located at distinct locations of the road. For example, multiple installations, each having respective sensors, may be positioned along a stretch of a road (e.g., at intervals of every one kilometer, three kilometers, or five kilometers). The plurality of sensors can include one or more cameras, one or more microphones, one or more inductive loop detectors, a global positioning system (GPS), a thermal sensor (e.g., temperature sensor), a light detection and ranging (LiDAR) scanner, a radio detection and ranging (RADAR) sensor, an infrared sensor, and one or more ultrasonic sensors.

The computer system collects, via the plurality of sensors (e.g., in real time), data of a plurality of vehicles that are traveling along a road. The computer system determines (e.g., in real time), according to the data, that the plurality of vehicles traveling along the road includes a first vehicle and a second vehicle ahead of the first vehicle. The second vehicle is beyond a sensing range of the first vehicle. In some instances, the second vehicle can be 500 meters, 1 km, 2 km, 5 km, or 10 km ahead of the first vehicle. The computer system, in accordance with the determination, identifies from the data second vehicle data corresponding to the second vehicle. The second vehicle data can include a location of the second vehicle and a speed of the second vehicle. In some embodiments, the speed of the second vehicle includes an actual speed (e.g., a real speed) of the second vehicle. In some embodiments, the speed of the second vehicle includes an average speed of the second vehicle. In some embodiments, the computer system determines a distance (e.g., absolute distance) between the first vehicle and the second vehicle according to the data of the plurality of vehicles. The computer system transmits (e.g., in real time, at runtime) the second vehicle data to the first vehicle. In some embodiments, the computer system transmits the second vehicle data to the first vehicle via a wireless communication network, such as a 5G network. The first vehicle is configured to at least partially autonomously drive in accordance with the second vehicle data and additional data collected by one or more first sensors of the first vehicle. As disclosed, the plurality of sensors that are positioned on the fixed installation can have a sensing range that is beyond a sensing range of one or more sensors of the first vehicle.

In some embodiments, the computer system transmits to the first vehicle information about the distance between the first vehicle and the second vehicle. In some embodiments, the computer system transmits the information about the distance between the first vehicle and the second vehicle and the speed of the second vehicle as a first (s, v) pair, wherein s represents the distance between the first vehicle and the second vehicle and v represents the speed of the second vehicle. In some embodiments, the first (s, v) pair is associated with a first timestamp. In some embodiments, the computer system determines a series of (e.g., two or more) (s, v) pairs to establish respective distances between the first vehicle and the second vehicle and respective speeds of the second vehicle over a time period, where each (s, v) pair in the series has a respective timestamp.

In some embodiments, the additional data collected by the one or more first sensors of the first vehicle include data of one or more other vehicles that are within a detection range of the one or more sensors, including respective distances between the one or more other vehicles and the first vehicle, respective speeds of the one or more other vehicles, and respective locations of the one or more other vehicles. In some embodiments, the first vehicle is configured to generate other (s, v) pairs, wherein the s in a respective other (s, v) pair represents the distance between the first vehicle and a respective other vehicle and the v in a respective other (s, v) pair represents a speed of the respective other vehicle (e.g., an absolute speed of the other vehicle, an average speed of the other vehicle, or a relative speed of the other vehicle relative to the speed of the first vehicle).

In some embodiments, the computer system determines, based on the data of the plurality of vehicles, an average traffic speed for a respective lane of one or more lanes of the road, for a predetermined position (e.g., a fixed point or a fixed location) of the road ahead of the first vehicle and a distance from the predetermined position of the road to the first vehicle. In some embodiments, the computer system transmits the average traffic speed and the distance to the first vehicle. The first vehicle is configured to at least partially autonomously drive in a first trajectory (e.g., according to a longitudinal speed profile) in accordance with the average traffic speed and the distance. In some embodiments, the average traffic speed and the distance are transmitted to the first vehicle as a first (s_1, v_1) pair, wherein s_1 represents the distance from the predetermined position of the road to the first vehicle for the respective lane at the predetermined position of the road and v_1 represents the average traffic speed for the respective lane at the predetermined position of the road.

In some embodiments, the computer system generates a spatial representation (e.g., a heat map) representing traffic density on the road in accordance with the data of the plurality of vehicles and transmits the spatial representation to the first vehicle. In some embodiments, the computer system generates, based at least in part on the data of the plurality of vehicles, one or more time series of traffic speed data of one or more lanes of the road corresponding to a predetermined position (e.g., a fixed point or a fixed location) of the road ahead of the first vehicle. In some embodiments, the first vehicle is configured to at least partially autonomously drive in accordance with the spatial representation and/or the one or more time series of traffic speed data of one or more lanes of the road.

FIG. 1 is an example vehicle driving environment 100 having a plurality of vehicles 102 (e.g., vehicles 102P, 102T, and 102V), in accordance with some embodiments. Each vehicle 102 has one or more processors, memory, a plurality of sensors, and a vehicle control system. The vehicle control system is configured to sense the vehicle driving environment 100 and drive on roads having different road conditions. The plurality of vehicles 102 may include passenger cars 102P (e.g., sport-utility vehicles and sedans), vans 102V, trucks 102T, and driver-less cars. Each vehicle 102 can collect sensor data and/or user inputs, execute user applications, present outputs on its user interface, and/or operate the vehicle control system to drive the vehicle 102. The collected data or user inputs can be processed locally (e.g., for training and/or for prediction) at the vehicle 102 and/or remotely by one or more servers 104. The one or more servers 104 provide system data (e.g., boot files, operating system images, and user applications) to the vehicle 102, and in some embodiments, process the data and user inputs received from the vehicle 102 when the user applications are executed on the vehicle 102. In some embodiments, the vehicle driving environment 100 further includes storage 106 for storing data related to the vehicles 102, servers 104, and applications executed on the vehicles 102.

For each vehicle 102, the plurality of sensors includes one or more of: (1) a global positioning system (GPS) sensors; (2) a light detection and ranging (LiDAR) scanner; (3) one or more cameras; (4) a radio detection and ranging (RADAR) sensor; (5) an infrared sensor; (6) one or more ultrasonic sensors; (7) a dedicated short-range communication (DSRC) module; (8) an inertial navigation system (INS) including accelerometers and gyroscopes; (9) an inertial measurement unit (IMU) for measuring and reporting acceleration, orientation, angular rates, and other gravitational forces; and/or (10) an odometry sensor. In some embodiments, a vehicle 102 includes a 5G communication module to facilitate vehicle communication jointly with or in place of the DSRC module. The cameras are configured to capture a plurality of images in the vehicle driving environment 100, and the plurality of images are applied to map the vehicle driving environment 100 to a 3D vehicle space and identify a location of the vehicle 102 within the environment 100. The cameras also operate with one or more other sensors (e.g., GPS, LiDAR, RADAR, and/or INS) to localize the vehicle 102 in the 3D vehicle space. For example, the GPS identifies a geographical position (geolocation) of the vehicle 102 on the Earth, and the INS measures relative vehicle speeds and accelerations between the vehicle 102 and adjacent vehicles 102. The LiDAR scanner measures the distance between the vehicle 102 and adjacent vehicles 102 and other objects. Data collected by these sensors is used to determine vehicle locations determined from the plurality of images or to facilitate determining vehicle locations between two images.

The vehicle control system includes a plurality of actuators for at least steering, braking, controlling the throttle (e.g., accelerating, maintaining a constant velocity, or decelerating), and transmission control. Depending on the level of automation, each of the plurality of actuators (or manually controlling the vehicle, such as by turning the steering wheel) can be controlled manually by a driver of the vehicle, automatically by the one or more processors of the vehicle, or jointly by the driver and the processors. When the vehicle 102 controls the plurality of actuators independently or jointly with the driver, the vehicle 102 obtains the sensor data collected by the plurality of sensors, identifies adjacent road features in the vehicle driving environment 100, tracks the motion of the vehicle, tracks the relative distance between the vehicle and any surrounding vehicles or other objects, and generates vehicle control instructions to at least partially autonomously control driving of the vehicle 102. Conversely, in some embodiments, when the driver takes control of the vehicle, the driver manually provides vehicle control instructions via a steering wheel, a braking pedal, a throttle pedal, and/or a gear lever directly. In some embodiments, a vehicle user application is executed on the vehicle and configured to provide a user interface. The driver provides vehicle control instructions to control the plurality of actuators of the vehicle control system via the user interface of the vehicle user application. By these means, the vehicle 102 is configured to drive with its own vehicle control system and/or the driver of the vehicle 102 according to the level of autonomy.

In some embodiments, autonomous vehicles include, for example, a fully autonomous vehicle, a partially autonomous vehicle, a vehicle with driver assistance, or an autonomous capable vehicle. Capabilities of autonomous vehicles can be associated with a classification system, or taxonomy, having tiered levels of autonomy. A classification system can be specified, for example, by industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention) as classified by the International Society of Automotive Engineers (SAE International). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. As used herein, the term "driver" may refer to a local operator or a remote operator. The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

In some embodiments, the vehicle 102 drives in the vehicle driving environment 100 at level 5. The vehicle 102 collects sensor data from the plurality of sensors, processes the sensor data to generate vehicle control instructions, and controls the vehicle control system to drive the vehicle autonomously in response to the vehicle control instructions. Alternatively, in some situations, the vehicle 102 drives in the vehicle driving environment 100 at level 0. The vehicle 102 collects the sensor data and processes the sensor data to provide feedback (e.g., a warning or an alert) to a driver of the vehicle 102 to allow the driver to drive the vehicle 102 manually and based on the driver's own judgement. Alternatively, in some situations, the vehicle 102 drives in the vehicle driving environment 100 partially autonomously at one of levels 1-4. The vehicle 102 collects the sensor data and processes the sensor data to generate a vehicle control instruction for a portion of the vehicle control system and/or provide feedback to a driver of the vehicle 102. The vehicle 102 is driven jointly by the vehicle control system of the vehicle 102 and the driver of the vehicle 102. In some embodiments, the vehicle control system and driver of the vehicle 102 control different portions of the vehicle 102. In some embodiments, the vehicle 102 determines the vehicle status. Based on the vehicle status, a vehicle control instruction of one of the vehicle control system or driver of the vehicle 102 preempts or overrides another vehicle control instruction provided by the other one of the vehicle control system or driver of the vehicle 102.

For the vehicle 102, the sensor data collected by the plurality of sensors, the vehicle control instructions applied to the vehicle control system, and the user inputs received via the vehicle user application form a collection of vehicle data 112. In some embodiments, at least a subset of the vehicle data 112 from each vehicle 102 is provided to one or more servers 104. A server 104 provides a central vehicle platform for collecting and analyzing the vehicle data 112, monitoring vehicle operation, detecting faults, providing driving solutions, and updating additional vehicle information 114 to individual vehicles 102 or client devices 108. In some embodiments, the server 104 manages vehicle data 112 of each individual vehicle 102 separately. In some embodiments, the server 104 consolidates vehicle data 112 from multiple vehicles 102 and manages the consolidated vehicle data jointly (e.g., the server 104 statistically aggregates the data).

Additionally, in some embodiments, the vehicle driving environment 100 further includes one or more client devices 108, such as desktop computers, laptop computers, tablet computers, and mobile phones. Each client device 108 is configured to execute a client user application associated with the central vehicle platform provided by the server 104. The client device 108 is logged into a user account on the client user application, and the user account is associated with one or more vehicles 102. The server 104 provides the collected vehicle data 112 and additional vehicle information 114 (e.g., vehicle operation information, fault information, or driving solution information) for the one or more associated vehicles 102 to the client device 108 using the user account of the client user application. In some embodiments, the client device 108 is located in the one or more vehicles 102, while in other embodiments, the client device is at a location distinct from the one or more associated vehicles 102. As such, the server 104 can apply its computational capability to manage the vehicle data 112 and facilitate vehicle monitoring and control on different levels (e.g., for each individual vehicle, for a collection of vehicles, and/or for related client devices 108).

The plurality of vehicles 102, the one or more servers 104, and the one or more client devices 108 are communicatively coupled to each other via one or more communication networks 110, which is used to provide communications links between these vehicles and computers connected together within the vehicle driving environment 100. The one or more communication networks 110 may include connections, such as a wired network, wireless communication links, or fiber optic cables. Examples of the one or more communication networks 110 include local area networks (LAN), wide area networks (WAN) such as the Internet, or a combination thereof. The one or more communication networks 110 are, in some embodiments, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VOIP), Wi-MAX, or any other suitable communication protocol. A connection to the one or more communication networks 110 may be established either directly (e.g., using 3G/4G/5G connectivity to a wireless carrier), or through a network interface (e.g., a router, a switch, a gateway, a hub, or an intelligent, dedicated whole-home control node), or through any combination thereof. In some embodiments, the one or more communication networks 110 allow for communication using any suitable protocols, like Transmission Control Protocol/Internet Protocol (TCP/IP). In some embodiments, each vehicle 102 is communicatively coupled to the servers 104 via a cellular communication network.

In some embodiments, deep learning techniques are applied by the vehicles 102, the servers 104, or both, to process the vehicle data 112. For example, in some embodiments, after image data is collected by the cameras of one of the vehicles 102, the image data is processed using an object detection model to identify objects (e.g., road features including, but not limited to, vehicles, lane lines, shoulder lines, road dividers, traffic lights, traffic signs, road signs, cones, pedestrians, bicycles, and drivers of the vehicles) in the vehicle driving environment 100. In some embodiments, additional sensor data is collected and processed by a vehicle control model to generate a vehicle control instruction for controlling the vehicle control system. In some embodiments, a vehicle planning model is applied to plan a driving control process based on the collected sensor data and the vehicle driving environment 100. The object detection model, vehicle control model, and vehicle planning model are collectively referred to herein as vehicle data processing models (i.e., machine learning models 250 in FIG. 2), each of which includes one or more neural networks. In some embodiments, such a vehicle data processing model is applied by the vehicles 102, the servers 104, or both, to process the vehicle data 112 to infer associated vehicle status and/or provide control signals. In some embodiments, a vehicle data processing model is trained by a server 104, and applied locally or provided to one or more vehicles 102 for inference of the associated vehicle status and/or to provide control signals. Alternatively, a vehicle data processing model is trained locally by a vehicle 102, and applied locally or shared with one or more other vehicles 102 (e.g., by way of the server 104). In some embodiments, a vehicle data processing model is trained in a supervised, semi-supervised, or unsupervised manner.

In some embodiments, the vehicle driving environment 100 further includes one or more installations 130 (e.g., an infrastructure) that are situated along a road. For example, in some embodiments, the installations 130 can positioned at locations along a road where traffic may be prone to buildup, such as a freeway entrance or exit, a lane merge zone (e.g., on a section of a road where two or more lanes merge), a tunnel, a toll booth, a traffic light area, an on-ramp region of a highway, and/or a junction (e.g., an intersection) where two or more roads converge, diverge, meet or cross. In some embodiments, a segment of a road can have multiple installations 130 that are positioned at regular intervals (e.g., every kilometer, every mile, every 2 miles, etc.) along the road. In some embodiments, the installations 130 include fixed, immovable structures. In some embodiments, the installations 130 are positioned ahead of traffic of interest (e.g., the vehicles are driving in a direction toward the installations).

The one or more installations 130, the plurality of vehicles 102, the one or more servers 104, and the one or more client devices 108 are communicatively coupled to each other via the one or more communication networks 110. In some embodiments, a vehicle 102 can be equipped with a vehicle-to-infrastructure (V2I) communication system, in which the vehicle 102 and the one of more installations 130 are communicating nodes that provide each other with information such as traffic information, weather information, road condition information, and safety warnings. In accordance with some embodiments, V2I involves the exchange of information between vehicles 102 and components (e.g., sensors 660, communication module 616, data processing module 626, and other components) of an installation 130.

In some embodiments, a respective vehicle 102 can be equipped with a vehicle-to-everything (V2X) communication system, in which the respective vehicle 102 can exchange information with the one of more installations 130 as well as with other vehicles that may be driving along the same road (e.g., route), or a different road, as the respective vehicle 102. The V2I and/or V2X communication system can be powered using 3G/4G/5G connectivity to a wireless carrier, or through a network interface (e.g., a router, a switch, a gateway, a hub, or an intelligent, dedicated whole-home control node), or through any combination thereof. In some embodiments, the V2I or V2X communication are powered by 5G, which advantageously allows large bandwidth, low latency information sharing between the vehicles and the installations, providing new opportunities for road condition estimation and weather conditions perception.

The installations 130 include one or more sensors 660 positioned at the installations 130. The sensors 660 are fixedly located on the installations 130 and are configured to detect, monitor, and gather data on various traffic-related parameters (e.g., vehicle traffic data, including traffic density, an average vehicle speed, honking/beeping from vehicles). In accordance with some embodiments of the present disclosure, the information collected by the sensors 660 are more detailed and instantaneous compared to information collected using a perception system on a single autonomous vehicle, because they have a fixed location, better detection coverage, and a defined field of view. In some embodiments, the one or more sensors incudes one or more of: an imaging sensor, a camera, a microphone (which may be part of the camera or separate from the camera), an anemometer (e.g., a wind speed and direction sensor), a global positioning system (GPS), a thermal sensor (e.g., a temperature sensor), an acoustic sensor, a microphone, a light detection and ranging (LiDAR) scanner, a radio detection and ranging (RADAR) sensor, an infrared sensor, an ultrasonic sensor. In some embodiments, the installations 130 include one or more inductive loop detectors for transmitting and receiving communication signals, and/or detecting the presence or vehicles.

In some embodiments, a respective installation 130 includes a communication module for facilitating information sharing between the vehicles 102 and the installation 130. For example, in some embodiments, the installation 130 gathers, from the vehicles 102 via the communication module, vehicle information 134. The vehicle information 134 can include information about vehicle dynamics (e.g., vehicle velocities and accelerations), vehicle data 112, and/or the additional vehicle information 114. In some embodiments, the vehicle information 134 can also include traffic, road, and/or weather information that are communicated from the vehicles 102 to the installation 130.

In some embodiments, the installation 130 provides at least a subset of infrastructure information 132 to the vehicles 102 and/or the one or more servers 104. The infrastructure information 132 can include sensor data collected by the sensors 660 and/or data processed by a computing unit of the installation 130 based on the sensor data and the vehicle information 134.

It is noted that the installation 130 illustrated in FIG. 1 does not reflect an actual size of the installation 130. In some embodiments, the installation 130 corresponds to an existing structure (e.g., a light pole, a billboard) standing near or on the road. Alternatively, in some embodiments, the installation 130 is a dedicated structure built at a fixed location near or on the road for collecting information of local road or whether conditions. The installation 130 may not be visible or discernable to passing vehicles from its appearance.

Figure 2:
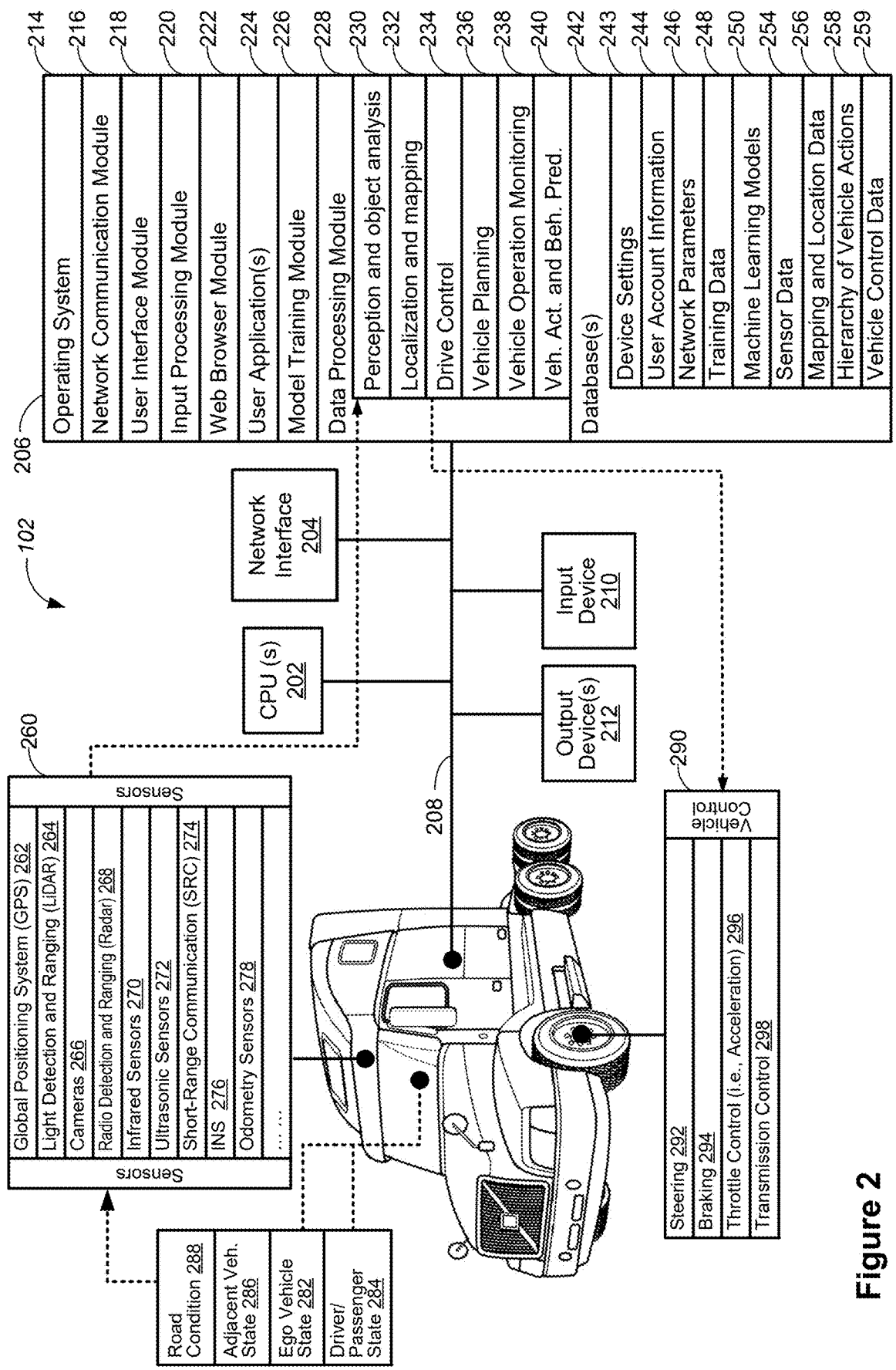
FIG. 2 is a block diagram of an example vehicle configured to be driven with a certain level of autonomy, in accordance with some embodiments.

FIG. 2 is a block diagram of an example vehicle 102 configured to be driven with a certain level of autonomy, in accordance with some embodiments. The vehicle 102 typically includes one or more processing units (CPUs) 202, one or more network interfaces 204, memory 206, and one or more communication buses 208 for interconnecting these components (sometimes called a chipset). The vehicle 102 includes one or more user interface devices. The user interface devices include one or more input devices 210, which facilitate user input, such as a keyboard, a mouse, a voice-command input unit or microphone, a touch screen display, a touch-sensitive input pad, a gesture capturing camera, or other input buttons or controls. Furthermore, in some embodiments, the vehicle 102 uses a microphone and voice recognition or a camera and gesture recognition to supplement or replace the keyboard. In some embodiments, the one or more input devices 210 include one or more cameras, scanners, or photo sensor units for capturing images, for example, of a driver and a passenger in the vehicle 102. The vehicle 102 also includes one or more output devices 212, which enable presentation of user interfaces and display content, including one or more speakers and/or one or more visual displays (e.g., a display panel located near to a driver's right hand in right-hand-side operated vehicles typical in the U.S.).

The vehicle 102 includes a plurality of sensors 260 configured to collect sensor data in a vehicle driving environment 100. The plurality of sensors 260 include one or more of a GPS 262, a LiDAR scanner 264, one or more cameras 266, a RADAR sensor 268, an infrared sensor 270, one or more ultrasonic sensors 272, an SRC module 274, an INS 276 including accelerometers and gyroscopes, and an odometry sensor 278. The GPS 262 localizes the vehicle 102 in Earth coordinates (e.g., using a latitude value and a longitude value) and can reach a first accuracy level less than 1 meter (e.g., 30 cm). The LiDAR scanner 264 uses light beams to estimate relative distances between the scanner 264 and a target object (e.g., another vehicle 102), and can reach a second accuracy level better than the first accuracy level of the GPS 262. The cameras 266 are installed at different locations on the vehicle 102 to monitor surroundings of the camera 266 from different perspectives. In some situations, a camera 266 is installed facing the interior of the vehicle 102 and configured to monitor the state of the driver of the vehicle 102. The RADAR sensor 268 emits electromagnetic waves and collects reflected waves to determine the speed and a distance of an object over which the waves are reflected. The infrared sensor 270 identifies and tracks objects in an infrared domain when lighting conditions are poor. The one or more ultrasonic sensors 272 are used to detect objects at a short distance (e.g., to assist parking). The SRC module 274 is used to exchange information with a road feature (e.g., a traffic light). The INS 276 uses the accelerometers and gyroscopes to measure the position, the orientation, and the speed of the vehicle. The odometry sensor 278 tracks the distance the vehicle 102 has travelled, (e.g., based on a wheel speed). In some embodiments, based on the sensor data collected by the plurality of sensors 260, the one or more processors 202 of the vehicle monitor its own vehicle state 282, the driver or passenger state 284, states of adjacent vehicles 286, and road conditions 288 associated with a plurality of road features.

The vehicle 102 has a control system 290, including a steering control 292, a braking control 294, a throttle control 296, a transmission control 298, signaling and lighting controls, and other controls. In some embodiments, one or more actuators of the vehicle control system 290 are automatically controlled based on the sensor data collected by the plurality of sensors 260 (e.g., according to one or more of the vehicle state 282, the driver or passenger state 284, states of adjacent vehicles 286, and/or road conditions 288).

The memory 206 includes high-speed random access memory, such as DRAM, SRAM, DDR RAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. In some embodiments, the memory 206 includes one or more storage devices remotely located from one or more processing units 202. The memory 206, or alternatively the non-volatile the memory within the memory 206, includes a non-transitory computer readable storage medium. In some embodiments, the memory 206, or the non-transitory computer readable storage medium of the memory 206, stores the following programs, modules, and data structures, or a subset or superset thereof:

- an operating system 214, which includes procedures for handling various basic system services and for performing hardware dependent tasks;
- a network communication module 216, which connects each vehicle 102 to other devices (e.g., another vehicle 102, a server 104, or a client device 108) via one or more network interfaces (wired or wireless) and one or more communication networks 110, such as the Internet, other wide area networks, local area networks, metropolitan area networks, and so on;
- a user interface module 218, which enables presentation of information (e.g., a graphical user interface for an application 224, widgets, websites and web pages thereof, audio content, and/or video content) at the vehicle 102 via one or more output devices 212 (e.g., displays or speakers);
- an input processing module 220, which detects one or more user inputs or interactions from one of the one or more input devices 210 and interprets the detected input or interaction;
- a web browser module 222, which navigates, requests (e.g., via HTTP), and displays websites and web pages thereof, including a web interface for logging into a user account of a user application 224 associated with the vehicle 102 or another vehicle;
- one or more user applications 224, which are executed at the vehicle 102. The user applications 224 include a vehicle user application that controls the vehicle 102 and enables users to edit and review settings and data associated with the vehicle 102;
- a model training module 226, which trains a machine learning model 250. The model 250 includes at least one neural network and is applied to process vehicle data (e.g., sensor data and vehicle control data) of the vehicle 102;
- a data processing module 228, which performs a plurality of on-vehicle tasks, including, but not limited to, perception and object analysis 230, vehicle localization and environment mapping 232, vehicle drive control 234, vehicle drive planning 236, local operation monitoring 238, and vehicle action and behavior prediction 240;
- a vehicle database 242, which stores vehicle data 112, including:

device settings 243, including common device settings (e.g., service tier, device model, storage capacity, processing capabilities, communication capabilities, and/or medical procedure settings) of the vehicle 102;

user account information 244 for the one or more user applications 224 (e.g., user names, security questions, account history data, user preferences, and predefined account settings);

network parameters 246 for the one or more communication networks 110, (e.g., IP address, subnet mask, default gateway, DNS server, and host name);

training data 248 for training the machine learning model 250;

machine learning models 250 for processing vehicle data 112, where in some embodiments, the machine learning model 250 is applied to process one or more images captured by a first vehicle 102A and predict a sequence of vehicle actions of a second vehicle through a hierarchy of interconnected vehicle actions;

sensor data 254 captured or measured by the plurality of sensors 260;

mapping and location data 256, which is determined from the sensor data 254 to map the vehicle driving environment 100 and locations of the vehicle 102 in the environment 100;

a hierarchy of interconnected vehicle actions 258 including a plurality of predefined vehicle actions that are organized to define a plurality of vehicle action sequences; and vehicle control data 259, which is automatically generated by the vehicle 102 or manually input by the user via the vehicle control system 290 based on predicted vehicle actions to drive the vehicle 102.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory 206 stores a subset of the modules and data structures identified above. In some embodiments, the memory 206 stores additional modules and data structures not described above.

Figure 3:
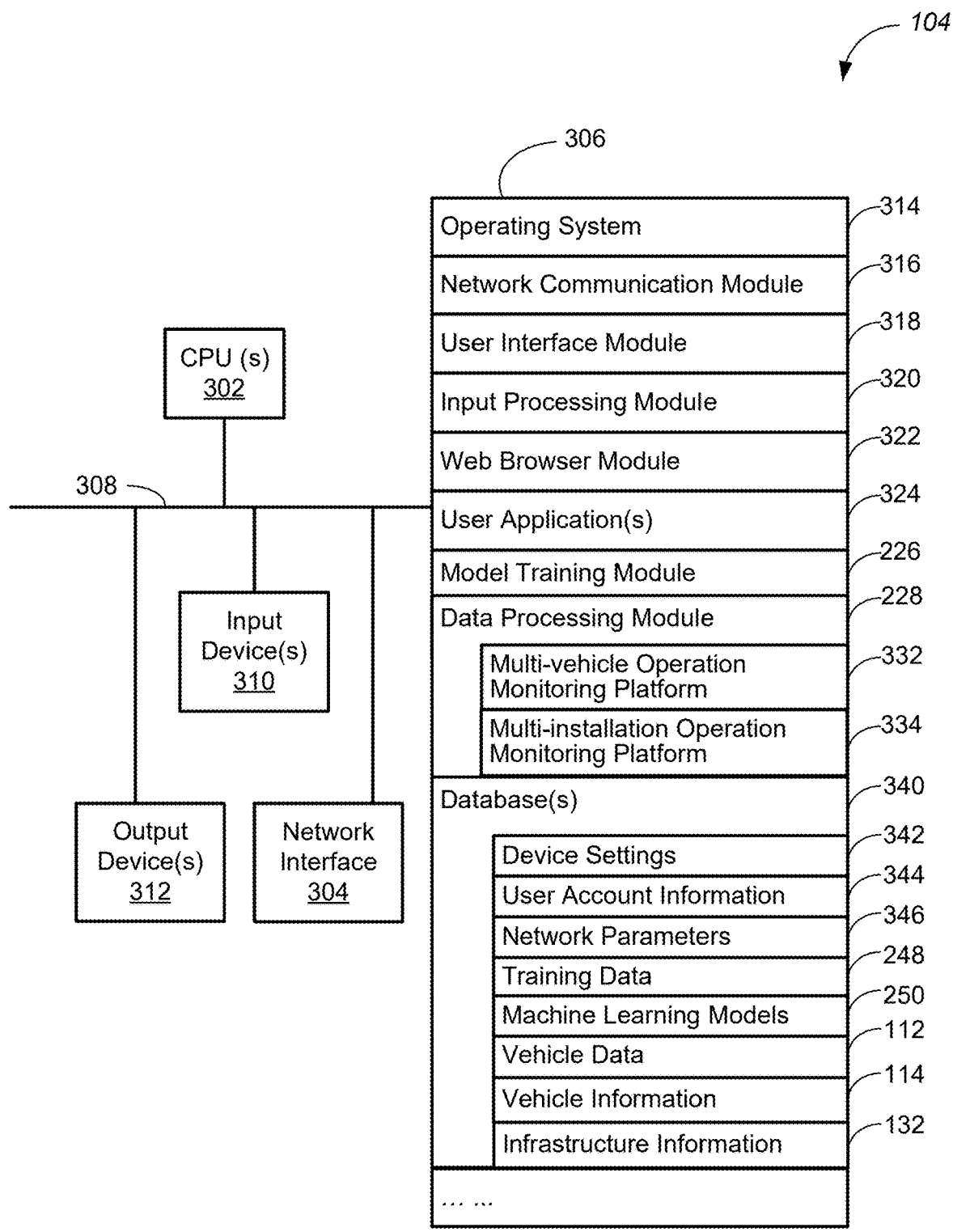
FIG. 3 is a block diagram of an example server for monitoring and managing vehicles in a vehicle driving environment, in accordance with some embodiments.

FIG. 3 is a block diagram of a server 104 for monitoring and managing vehicles 102 in a vehicle driving environment (e.g., the environment 100 in FIG. 1), in accordance with some embodiments. Examples of the server 104 include, but are not limited to, a server computer, a desktop computer, a laptop computer, a tablet computer, or a mobile phone. The server 104 typically includes one or more processing units (CPUs) 302, one or more network interfaces 304, memory 306, and one or more communication buses 308 for interconnecting these components (sometimes called a chipset). The server 104 includes one or more user interface devices. The user interface devices include one or more input devices 310, which facilitate user input, such as a keyboard, a mouse, a voice-command input unit or microphone, a touch screen display, a touch-sensitive input pad, a gesture capturing camera, or other input buttons or controls. Furthermore, in some embodiments, the server 104 uses a microphone and voice recognition or a camera and gesture recognition to supplement or replace the keyboard. In some embodiments, the one or more input devices 310 include one or more cameras, scanners, or photo sensor units for capturing images, for example, of graphic serial codes printed on electronic devices. The server 104 also includes one or more output devices 312, which enable presentation of user interfaces and display content, including one or more speakers and/or one or more visual displays.

The memory 306 includes high-speed random access memory, such as DRAM, SRAM, DDR RAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. In some embodiments, the memory 306 includes one or more storage devices remotely located from one or more processing units 302. The memory 306, or alternatively the non-volatile memory within memory 306, includes a non-transitory computer readable storage medium. In some embodiments, the memory 306, or the non-transitory computer readable storage medium of the memory 306, stores the following programs, modules, and data structures, or a subset or superset thereof:

an operating system 314, which includes procedures for handling various basic system services and for performing hardware dependent tasks;

a network communication module 316, which connects the server 104 to other devices (e.g., vehicles 102, another server 104, and/or client devices 108) via one or more network interfaces (wired or wireless) and one or more communication networks 110, such as the Internet, other wide area networks, local area networks, metropolitan area networks, and so on;

a user interface module 318, which enables presentation of information (e.g., a graphical user interface for user application 324, widgets, websites and web pages thereof, audio content, and/or video content) at the vehicle 102 via one or more output devices 312 (e.g., displays or speakers);

an input processing module 320, which detects one or more user inputs or interactions from one of the one or more input devices 310 and interprets the detected input or interaction;

a web browser module 322, which navigates, requests (e.g., via HTTP), and displays websites and web pages thereof, including a web interface for logging into a user account of a user application 324;

one or more user applications 324, which are executed at the server 104. The user applications 324 include a vehicle user application that associates vehicles 102 with user accounts and facilitates controlling the vehicles 102, and enables users to edit and review settings and data associated with the vehicles 102;

a model training module 226, which trains a machine learning model 250, where the model 250 includes at least one neural network and is applied to process vehicle data (e.g., sensor data and vehicle control data) of one or more vehicles 102;

a data processing module 228, which manages:
 a multi-vehicle operation monitoring platform 332 configured to collect vehicle data 112 from a plurality of vehicles 102, monitor vehicle operation, detect faults, provide driving solutions, and update additional vehicle information 114 to individual vehicles 102 or client devices 108. The data processing module 228 manages vehicle data 112 for each individual vehicle 102 separately or processes vehicle data 112 of multiple vehicles 102 jointly (e.g., statistically, in the aggregate); and a multi-installation operation monitoring platform 334 configured to collect infrastructure information 132 from a plurality of installations 130, monitor installation operation, detect faults (e.g., sensor 660 faults). In some embodiments, infrastructure information 132 for each individual installation 130 is managed separately. In some embodiments, infrastructure information 132 from multiple installations 130 are processed jointly (e.g., statistically, in the aggregate);

one or more databases 340 for storing vehicle server data and infrastructure (e.g., installation) data, including:

device settings 342, which include common device settings (e.g., service tier, device model, storage capacity, processing capabilities, communication capabilities, and/or medical procedure settings) of the server 104;

user account information 344 for the one or more user applications 324 (e.g., user names, security questions, account history data, user preferences, and predefined account settings);

network parameters 346 for the one or more communication networks 110, (e.g., IP address, subnet mask, default gateway, DNS server, and host name);

training data 248 for training the machine learning model 250;

machine learning models 250 for processing vehicle data;

vehicle data 112, which is collected from a plurality of vehicles 102 and includes sensor data 254, mapping and location data 256, and vehicle control data 259;

additional vehicle information 114, including vehicle operation information, fault information, and/or driving solution information, which are generated from the collected vehicle data 112; and infrastructure information 132, including data collected by sensors 660 of the installations 130 and data processed by the installations 130 based on the data collected by the sensors 660 and the vehicle information 134.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory 306 stores a subset of the modules and data structures identified above. In some embodiments, the memory 306 stores additional modules and data structures not described above.

Figure 4:
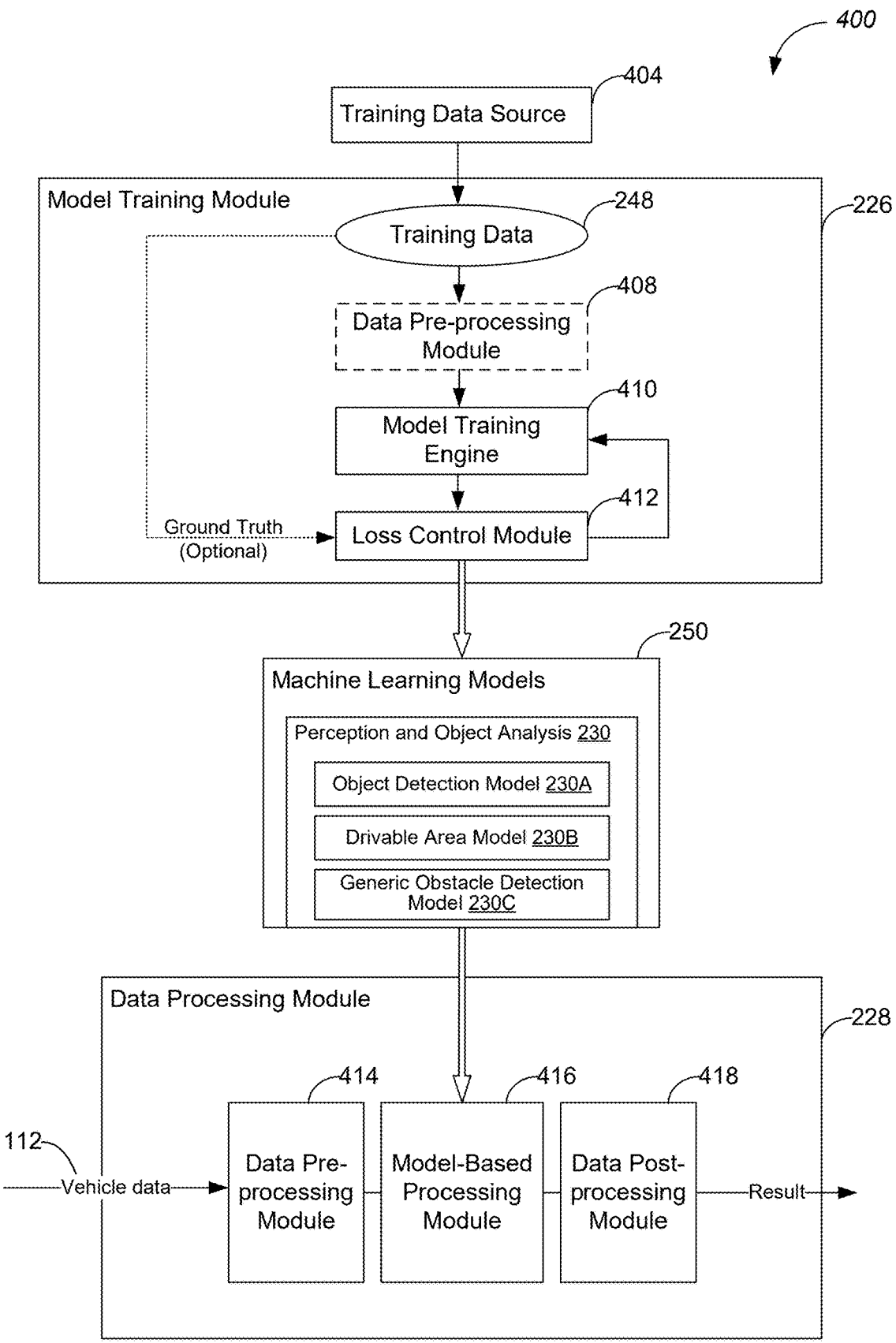
FIG. 4 is a block diagram of a machine learning system for training and applying vehicle data processing models for facilitating at least partial autonomous driving of a vehicle, in accordance with some embodiments.
Figure 5A:
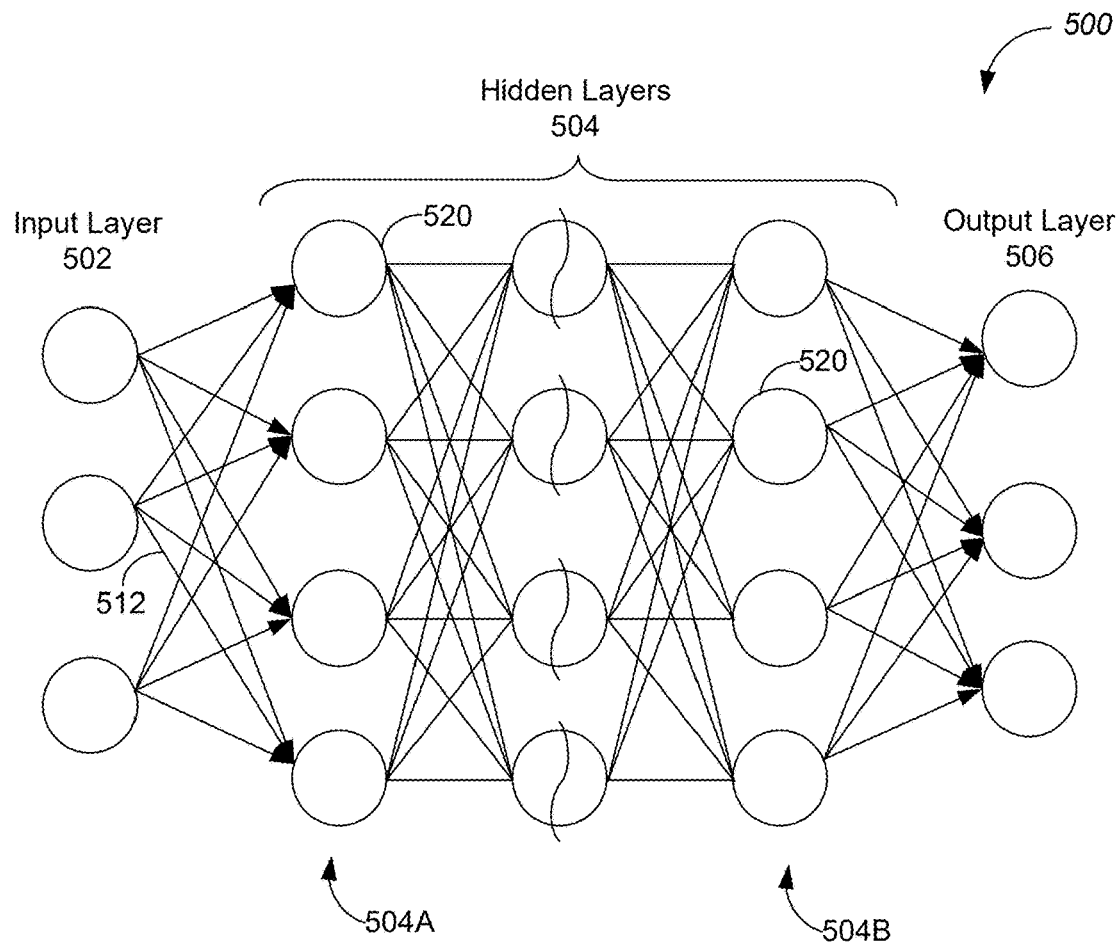
FIG. 5A is a structural diagram of an example neural network applied to process vehicle data in a vehicle data processing model, in accordance with some embodiments.
Figure 5B:
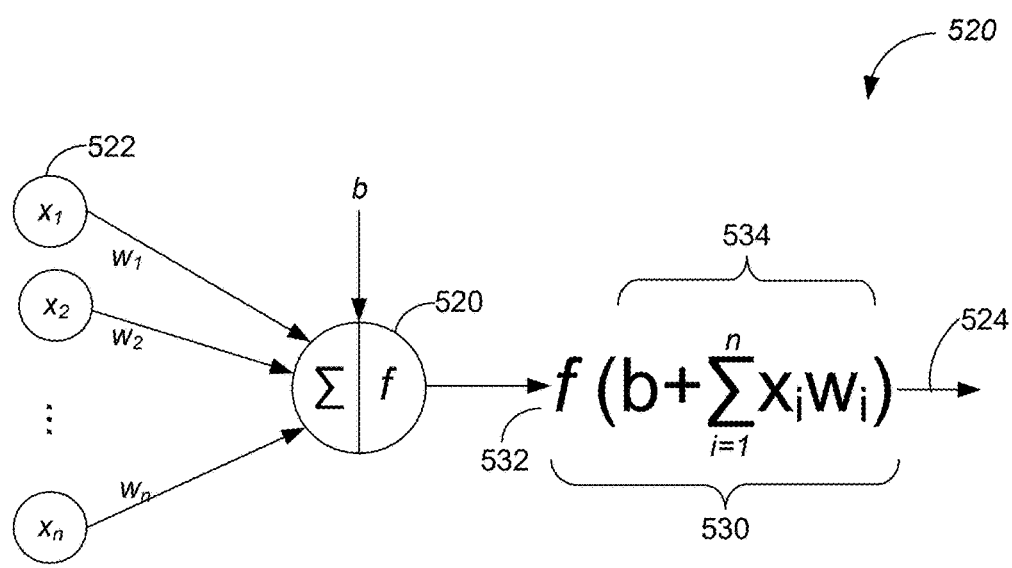
FIG. 5B is an example node in the neural network, in accordance with some embodiments.
Figure 6:
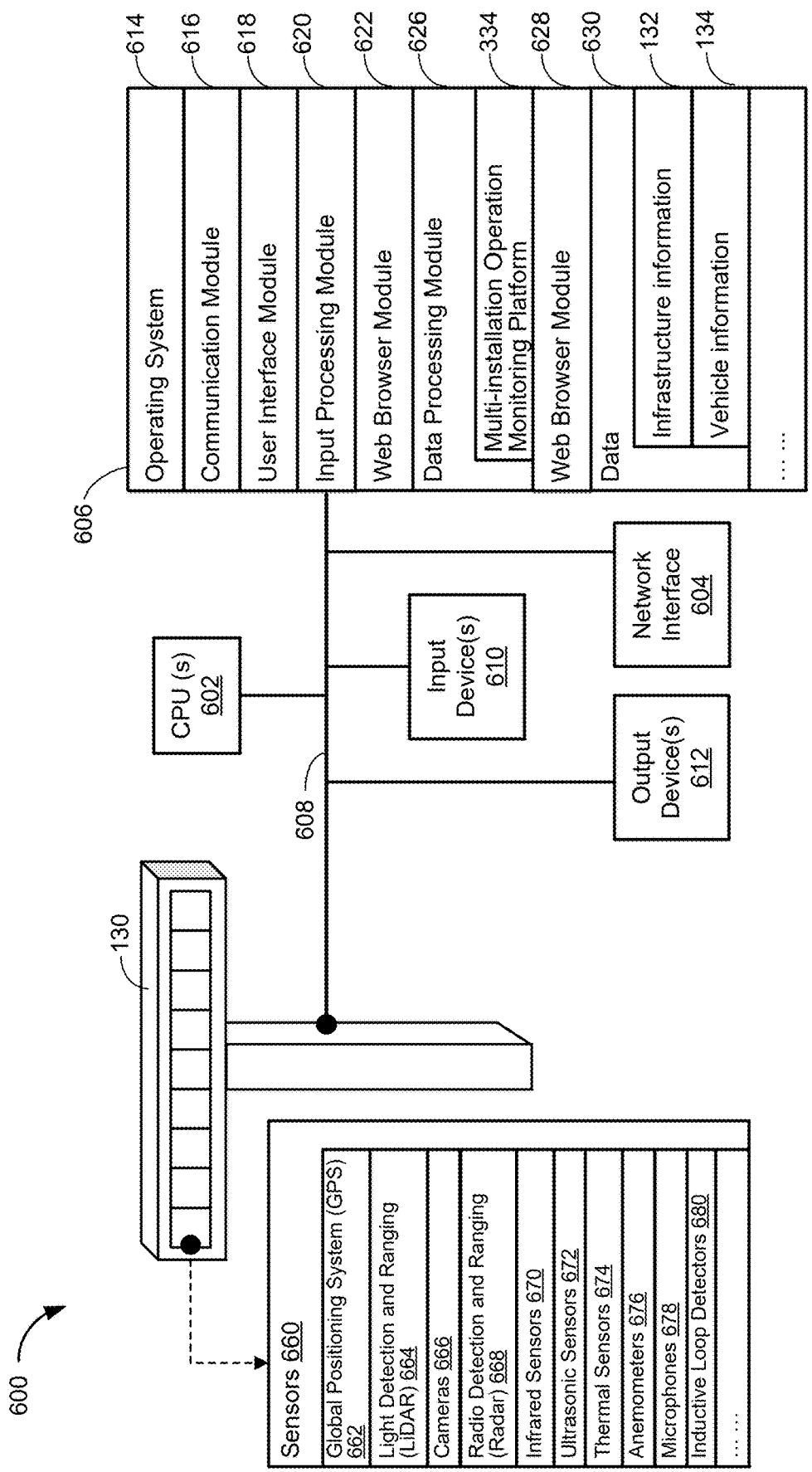
FIG. 6 is a block diagram of a computer system associated with an installation, in accordance with some embodiments.

FIGS. 4, 5A, and 5B provide background on the machine learning systems described herein, which are helpful in understanding the details of the embodiments described from FIG. 6 onward.

FIG. 4 is a block diagram of a machine learning system 400 for training and applying machine learning models 250 for facilitating driving of a vehicle, in accordance with some embodiments. The machine learning system 400 includes a model training module 226 establishing one or more machine learning models 250 and a data processing module 228 for processing vehicle data 112 using the machine learning model 250. In some embodiments, both the model training module 226 (e.g., the model training module 226 in FIG. 2) and the data processing module 228 are located within the vehicle 102, while a training data source 404 provides training data 248 to the vehicle 102. In some embodiments, the training data source 404 is the data obtained from the vehicle 102 itself, from a server 104, from storage 106, or from another vehicle or vehicles 102. Alternatively, in some embodiments, the model training module 226 (e.g., the model training module 226 in FIG. 3) is located at a server 104, and the data processing module 228 is located in a vehicle 102. The server 104 trains the data processing models 250 and provides the trained models 250 to the vehicle 102 to process real-time vehicle data 112 detected by the vehicle 102. In some embodiments, the training data 248 provided by the training data source 404 include a standard dataset (e.g., a set of road images) widely used by engineers in the autonomous vehicle industry to train machine learning models 250. In some embodiments, the training data 248 includes vehicle data 112 and/or additional vehicle information 114, which is collected from one or more vehicles 102 that will apply the machine learning models 250 or collected from distinct vehicles 102 that will not apply the machine learning models 250. The vehicle data 112 further includes one or more of sensor data 254, road mapping and location data 256, and control data 259. Further, in some embodiments, a subset of the training data 248 is modified to augment the training data 248. The subset of modified training data is used in place of or jointly with the subset of training data 248 to train the machine learning models 250.

In some embodiments, the model training module 226 includes a model training engine 410, and a loss control module 412. Each machine learning model 250 is trained by the model training engine 410 to process corresponding vehicle data 112 to implement a respective on-vehicle task. The on-vehicle tasks include, but are not limited to, perception and object analysis 230, vehicle localization and environment mapping 232, vehicle drive control 234, vehicle drive planning 236, local operation monitoring 238, and vehicle action and behavior prediction 240 (FIG. 2). Specifically, the model training engine 410 receives the training data 248 corresponding to a machine learning model 250 to be trained, and processes the training data to build the machine learning model 250. In some embodiments, during this process, the loss control module 412 monitors a loss function comparing the output associated with the respective training data item to a ground truth of the respective training data item. In these embodiments, the model training engine 410 modifies the machine learning models 250 to reduce the loss, until the loss function satisfies a loss criteria (e.g., a comparison result of the loss function is minimized or reduced below a loss threshold). The machine learning models 250 are thereby trained and provided to the data processing module 228 of a vehicle 102 to process real-time vehicle data 112 from the vehicle.

In some embodiments, the model training module 226 further includes a data pre-processing module 408 configured to pre-process the training data 248 before the training data 248 is used by the model training engine 410 to train a machine learning model 250. For example, an image pre-processing module 408 is configured to format road images in the training data 248 into a predefined image format. For example, the preprocessing module 408 may normalize the road images to a fixed size, resolution, or contrast level. In another example, an image pre-processing module 408 extracts a region of interest (ROI) corresponding to a drivable area in each road image or separates content of the drivable area into a distinct image.

In some embodiments, the model training module 226 uses supervised learning in which the training data 248 is labelled and includes a desired output for each training data item (also called the ground truth in some situations). In some embodiments, the desirable output is labelled manually by people or labelled automatically by the model training model 226 before training. In some embodiments, the model training module 226 uses unsupervised learning in which the training data 248 is not labelled. The model training module 226 is configured to identify previously undetected patterns in the training data 248 without pre-existing labels and with little or no human supervision. Additionally, in some embodiments, the model training module 226 uses partially supervised learning in which the training data is partially labelled.

In some embodiments, the data processing module 228 includes a data pre-processing module 414, a model-based processing module 416, and a data post-processing module 418. The data pre-processing modules 414 pre-processes vehicle data 112 based on the type of the vehicle data 112. In some embodiments, functions of the data pre-processing modules 414 are consistent with those of the pre-processing module 408, and convert the vehicle data 112 into a pre-defined data format that is suitable for the inputs of the model-based processing module 416. The model-based processing module 416 applies the trained machine learning model 250 provided by the model training module 226 to process the pre-processed vehicle data 112. In some embodiments, the model-based processing module 416 also monitors an error indicator to determine whether the vehicle data 112 has been properly processed in the machine learning model 250. In some embodiments, the processed vehicle data is further processed by the data post-processing module 418 to create a preferred format or to provide additional vehicle information 114 that can be derived from the processed vehicle data. The data processing module 228 uses the processed vehicle data to at least partially autonomously drive the vehicle 102 (e.g., at least partially autonomously). For example, the processed vehicle data includes vehicle control instructions that are used by the vehicle control system 290 to drive the vehicle 102.

In some embodiments, the data processing module 228 of the vehicle 102 (e.g., a first vehicle) is applied to perform perception and object analysis 230 by obtaining a road image including a road surface along which the first vehicle is travelling, identifying one or more identifiable objects on the road surface in the road image, and detecting a plurality of objects on the road surface in the road image. The data processing module 228 eliminates the one or more identifiable objects from the plurality of objects in the road image to determine one or more unidentifiable objects on the road surface in the road image. The first vehicle is at least partially autonomously driven by treating the one or more unidentifiable objects differently from the one or more identifiable objects. Further, in some embodiments, the machine learning models 250 of the vehicle 102 includes an object detection model 230A and a drivable area model 230B. The object detection model 230A is configured to identify the one or more identifiable objects in the road image and associate each identifiable object with a predefined object type or class. The drivable area model 230B is configured to determine a road surface in the road image. Additionally, in some embodiments, the machine learning models 250 includes a generic obstacle detection model 230C configured to detect a plurality of objects on the road surface in the road image, e.g., with or without determining a predefined object type or class of each of the plurality of objects. The generic obstacle detection model 230C is optionally modified from the drivable area model 230C by way of retraining.

FIG. 5A is a structural diagram of an example neural network 500 applied to process vehicle data in a machine learning model 250, in accordance with some embodiments, and FIG. 5B is an example node 520 in the neural network 500, in accordance with some embodiments. It should be noted that this description is used as an example only, and other types or configurations may be used to implement the embodiments described herein. The machine learning model 250 is established based on the neural network 500. A corresponding model-based processing module 416 applies the machine learning model 250 including the neural network 500 to process vehicle data 112 that has been converted to a predefined data format. The neural network 500 includes a collection of nodes 520 that are connected by links 512. Each node 520 receives one or more node inputs 522 and applies a propagation function 530 to generate a node output 524 from the one or more node inputs. As the node output 524 is provided via one or more links 512 to one or more other nodes 520, a weight w associated with each link 512 is applied to the node output 524. Likewise, the one or more node inputs 522 are combined based on corresponding weights $w_1$, $w_2$, $w_3$, and $w_4$ according to the propagation function 530. In an example, the propagation function 530 is computed by applying a non-linear activation function 532 to a linear weighted combination 534 of the one or more node inputs 522.

The collection of nodes 520 is organized into layers in the neural network 500. In general, the layers include an input layer 502 for receiving inputs, an output layer 506 for providing outputs, and one or more hidden layers 504 (e.g., layers 504A and 504B) between the input layer 502 and the output layer 506. A deep neural network has more than one hidden layer 504 between the input layer 502 and the output layer 506. In the neural network 500, each layer is only connected with its immediately preceding and/or immediately following layer. In some embodiments, a layer is a "fully connected" layer because each node in the layer is connected to every node in its immediately following layer. In some embodiments, a hidden layer 504 includes two or more nodes that are connected to the same node in its immediately following layer for down sampling or pooling the two or more nodes. In particular, max pooling uses a maximum value of the two or more nodes in the layer for generating the node of the immediately following layer.

In some embodiments, a convolutional neural network (CNN) is applied in a machine learning model 250 to process vehicle data (e.g., video and image data captured by cameras 266 of a vehicle 102). The CNN employs convolution operations and belongs to a class of deep neural networks. The hidden layers 504 of the CNN include convolutional layers. Each node in a convolutional layer receives inputs from a receptive area associated with a previous layer (e.g., nine nodes). Each convolution layer uses a kernel to combine pixels in a respective area to generate outputs. For example, the kernel may be to a 3×3 matrix including weights applied to combine the pixels in the respective area surrounding each pixel. Video or image data is pre-processed to a predefined video/image format corresponding to the inputs of the CNN. In some embodiments, the pre-processed video or image data is abstracted by the CNN layers to form a respective feature map. In this way, video and image data can be processed by the CNN for video and image recognition or object detection.

In some embodiments, a recurrent neural network (RNN) is applied in the machine learning model 250 to process vehicle data 112. Nodes in successive layers of the RNN follow a temporal sequence, such that the RNN exhibits a temporal dynamic behavior. In an example, each node 520 of the RNN has a time-varying real-valued activation. It is noted that in some embodiments, two or more types of vehicle data are processed by the data processing module 228, and two or more types of neural networks (e.g., both a CNN and an RNN) are applied in the same machine learning model 250 to process the vehicle data jointly.

The training process is a process for calibrating all of the weights w; for each layer of the neural network 500 using training data 248 that is provided in the input layer 502. The training process typically includes two steps, forward propagation and backward propagation, which are repeated multiple times until a predefined convergence condition is satisfied. In the forward propagation, the set of weights for different layers are applied to the input data and intermediate results from the previous layers. In the backward propagation, a margin of error of the output (e.g., a loss function) is measured (e.g., by a loss control module 412), and the weights are adjusted accordingly to decrease the error. The activation function 532 can be linear, rectified linear, sigmoidal, hyperbolic tangent, or other types. In some embodiments, a network bias term b is added to the sum of the weighted combination 534 from the previous layer before the activation function 532 is applied. The network bias b provides a perturbation that helps the neural network 500 avoid over fitting the training data. In some embodiments, the result of the training includes a network bias parameter b for each layer.

FIG. 6 is a block diagram of a computer system 600 associated with an installation 130 for detecting conditions for vehicle driving in a vehicle driving environment (e.g., the environment 100 in FIG. 1), in accordance with some embodiments. The installation 130 includes a plurality of sensors 660. In some embodiments, the plurality of sensors 660 include one or more of a GPS 662, a LIDAR scanner 664, one or more cameras 666, a RADAR sensor 668, one or more infrared sensor 670, one or more ultrasonic sensors 672, one or more thermal sensors 674 (e.g., for measuring heat and/or temperature), one or more anemometers 676 for measuring wind speed and wind direction, and one or more microphones 678 for capturing audio in a vicinity of the installation 130. In some embodiments, the one or more microphones 678 are part of the cameras 666. In some embodiments, the one or more microphones 678 are separate from the cameras 666. In some embodiments, the plurality of sensors 660 include one or more inductive loop detectors 680 for transmitting and receiving communication signals, and/or detecting the presence or vehicles.

In some embodiments, the computer system 600 is physically co-located at the installation 130. For example, the computer system 600 includes a microcontroller chip that is located locally at the installation 130, and at least a subset of the data collected at the installation 130 (e.g., using the sensors 660) is processed locally by the computer system 600. In some embodiments, the computer system 600 is at a physical location different from the installation 130. For example, the computer system 600 can include a cloud computer system that is communicatively connected to the installation 130. In some embodiments, the computer system includes one or more distinct systems located at distinct locations of a road or distinct systems located at different roads. Examples of the computer system 600 include, but are not limited to, a server computer, a desktop computer, a laptop computer, a tablet computer, or a mobile phone. The computer system 600 typically includes one or more processing units (CPUs) 602, one or more network interfaces 604, memory 606, and one or more communication buses 608 for interconnecting these components (sometimes called a chipset). The computer system 600 includes one or more user interface devices. The user interface devices include one or more input devices 610, which facilitate user input, such as a keyboard, a mouse, a voice-command input unit or microphone, a touch screen display, a touch-sensitive input pad, a gesture capturing camera, or other input buttons or controls. Furthermore, in some embodiments, the computer system 600 uses a microphone and voice recognition or a camera and gesture recognition to supplement or replace the keyboard. In some embodiments, the one or more input devices 610 include one or more cameras, scanners, or photo sensor units for capturing images, for example, of graphic serial codes printed on electronic devices. The computer system 600 also includes one or more output devices 610, which enable presentation of user interfaces and display content, including one or more speakers and/or one or more visual displays.

The memory 606 includes high-speed random access memory, such as DRAM, SRAM, DDR RAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. In some embodiments, the memory 606 includes one or more storage devices remotely located from the one or more processing units 602. The memory 606, or alternatively the non-volatile memory within memory 606, includes a non-transitory computer readable storage medium. In some embodiments, the memory 606, or the non-transitory computer readable storage medium of the memory 606, stores the following programs, modules, and data structures, or a subset or superset thereof:

- an operating system 614, which includes procedures for handling various basic system services and for performing hardware dependent tasks;
- a communication module 616, which connects the computer system to other devices (e.g., vehicles 102, server 104, installations 130, and/or client devices 108) via one or more network interfaces (wired or wireless) and one or more communication networks 110, such as the Internet, other wide area networks, local area networks, metropolitan area networks, and so on. In some embodiments, the communications module 616 gathers information about road and weather conditions from vehicles 102 via a V2I or a V2X communication system that is installed on the vehicles 102. In some embodiments, the V2I or V2X communication system operate on a network that provides high speed, low latency communication;
- a user interface module 618, which enables presentation of information, widgets, websites and web pages thereof, audio content, and/or video content) via one or more output devices 612 (e.g., displays or speakers);
- an input processing module 620, which detects one or more user inputs or interactions from one of the one or more input devices 610 and interprets the detected input or interaction;

a web browser module 622, which navigates, requests (e.g., via HTTP), and displays websites and web pages thereof;

a data processing module 626, which manages a multi-installation operation monitoring platform 334 configured to collect infrastructure information 132 from a plurality of installations 130, monitor installation operation, detect faults (e.g., faults from sensors 660). In some embodiments, the data processing module 626 manages infrastructure information 132 for each individual installation 130 separately or processes infrastructure information 132 from multiple installations 130 jointly (e.g., statistically, in the aggregate);

one or more machine learning models 628. In some embodiments, the machine learning models 628 include at least one neural network and is applied to process vehicle traffic data collected by the sensors 660 and output a determination of whether the vehicle traffic data constitutes an event;

data 630 that is stored locally on the computer system 600 or on one or more databases (e.g., database(s) 340), including:

infrastructure information 132. In some embodiments, infrastructure information 132 includes data collected by sensors 660 of installations 130. In some embodiments, infrastructure information 132 includes data that is processed by the installations 130 (e.g., via computer system 600) according to data collected by sensors 660 and/or vehicle information 134; and vehicle information 134. In some embodiments, vehicle information 134 includes information gathered by installations 130 from vehicles 102 via communication module 616. In some embodiments, vehicle information 134 includes information about vehicle dynamics (e.g., vehicle velocities and accelerations), vehicle data 112, and/or the additional vehicle information 114. In some embodiments, the vehicle information 134 includes include traffic, road, and/or weather information that are transmitted from the vehicles 102 to the installations 130.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory 606 stores a subset of the modules and data structures identified above. In some embodiments, the memory 606 stores additional modules and data structures not described above. In some embodiments, a subset of the operations performed at the computer system 600 can also be performed at the server 104.

Figure 7:
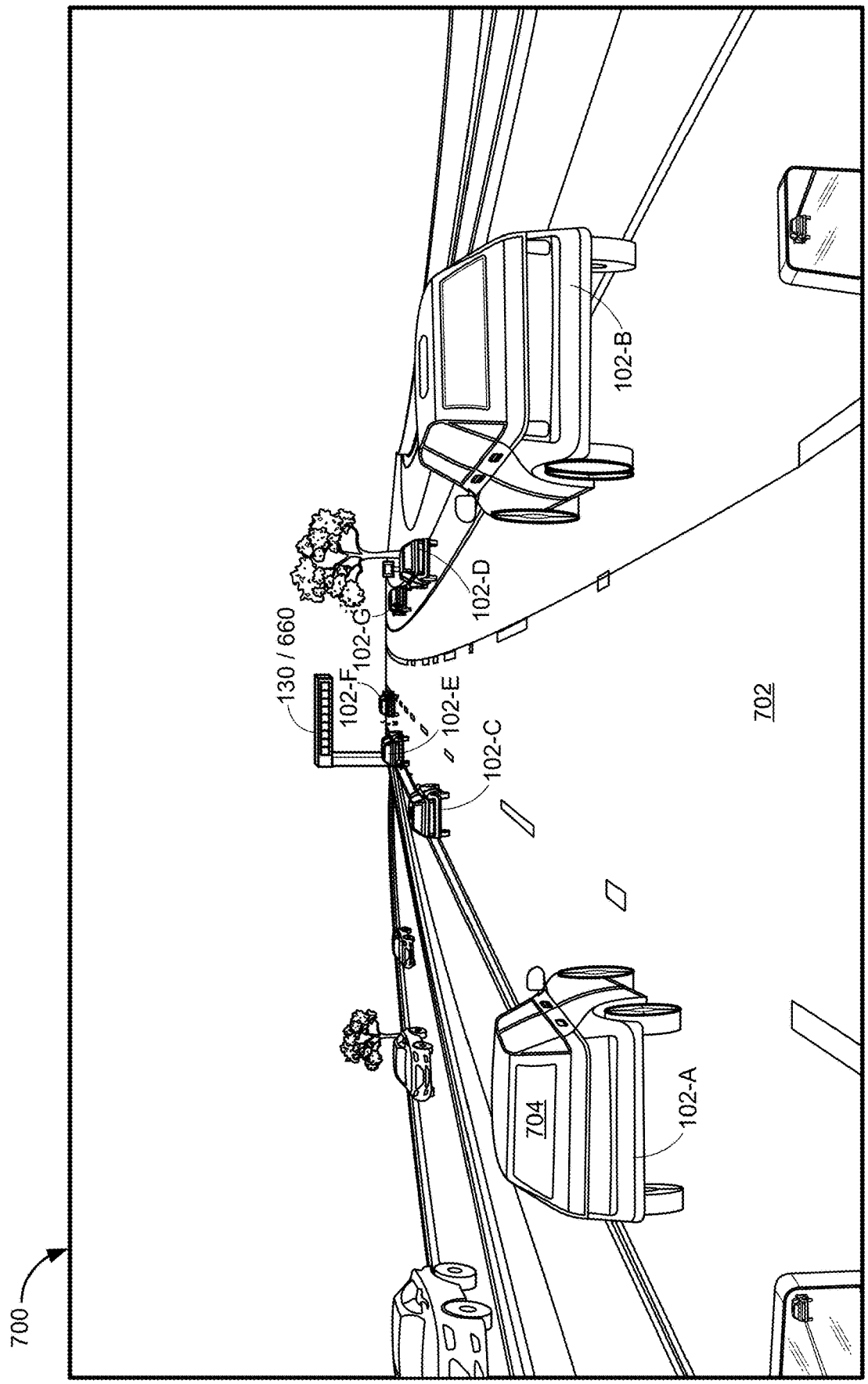
FIG. 7 illustrates an exemplary scene where vehicles are traveling on a road that includes an installation, in accordance with some embodiments.

FIG. 7 illustrates an exemplary scene 700 where vehicles 102 (e.g., vehicle 102-A to vehicle 102-G) are traveling on a road 702 that includes an installation 130, in accordance with some embodiments. The installation 130 is positioned along the road 702 and the vehicles 102-A to 102-G are traveling in a direction toward the installation 130.

In some embodiments, a distance between the vehicle 102-A and the vehicle 102-C can be 50 m to 100 m, whereas a distance between the vehicle 102-A and the vehicle 102-F (or the vehicle 102-G) can be 500 m, 1 km, 2 km, or 3 km. In some embodiments, the vehicle 102-A includes sensors 704 (e.g., sensors 260) that are positioned onboard the vehicle 102-A. In some embodiments, the vehicle 102-B and the vehicle 102-C are within a sensing range of the sensors 704. In some embodiments, the vehicle 102-F and the vehicle 102-G are outside the sensing range of the sensors 704.

In some embodiments, the installation 130 includes sensors 660 that are fixedly positioned on the installation 130. The sensors 660 collect data of vehicles traveling on the road. In some embodiments, the sensors 660 have a sensing range that is capable of detecting all the vehicles 102-A to 102-G on the road 702.

In some embodiments, a respective vehicle 102 (e.g., vehicle 102-A) is equipped with a V2I communication system (e.g., communication module 616) that facilitates communication between the vehicle 102 and the installation 130 (e.g., via CPU(s) 602). In some embodiments, the CPU(s) 602 generates traffic information according to data collected by the sensors 660. Exemplary traffic information can include real-time information about traffic flow (e.g., an average speed of vehicles traveling on the road, or an average speed of vehicles traveling on a respective lane of the road), traffic signal timings (when the road includes traffic lights), and/or presence of traffic incidents.

Figure 8:
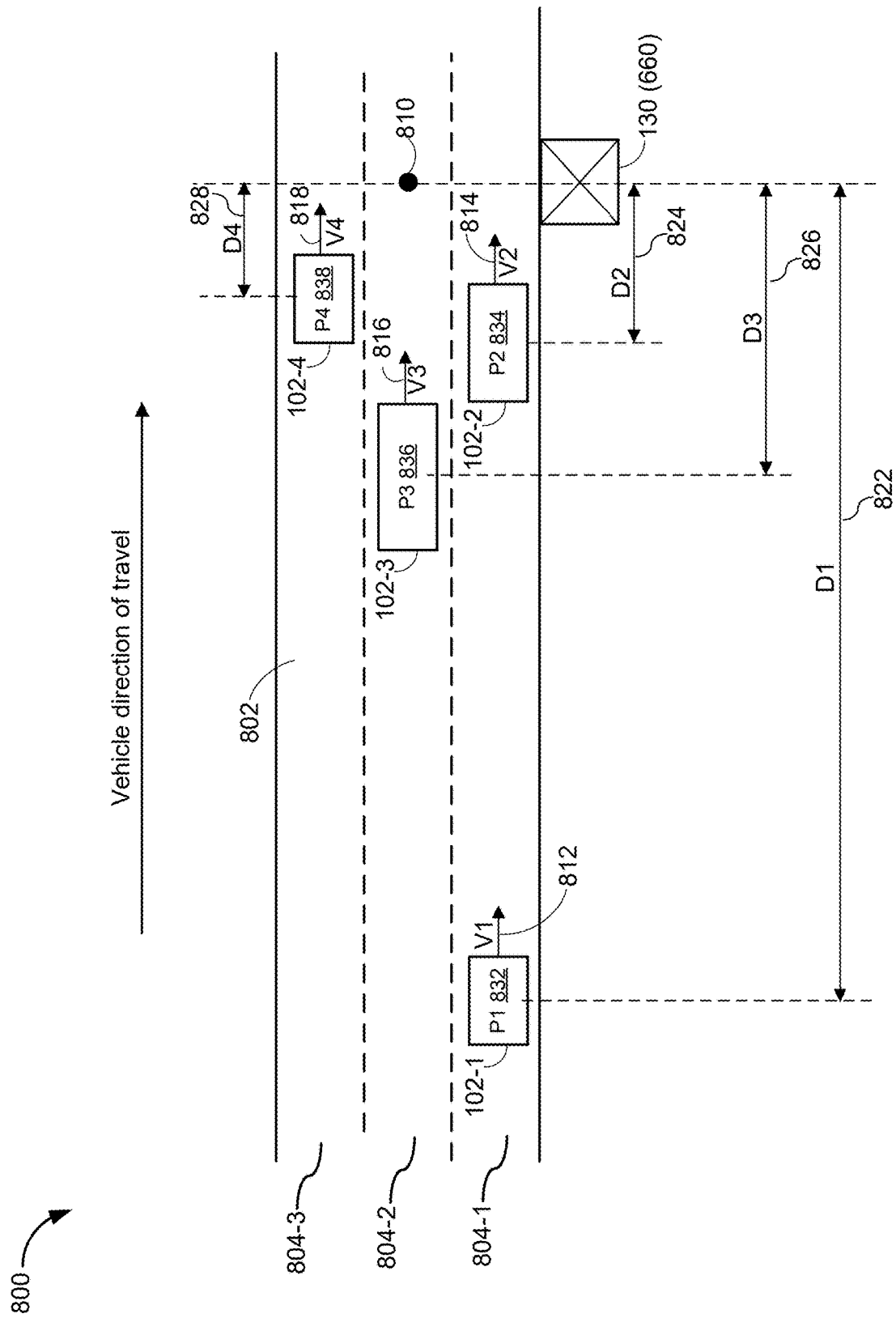
FIG. 8 illustrates an example schematic plan view image of a road having multiple lanes and an installation, in accordance with some embodiments.
Figure 9A:
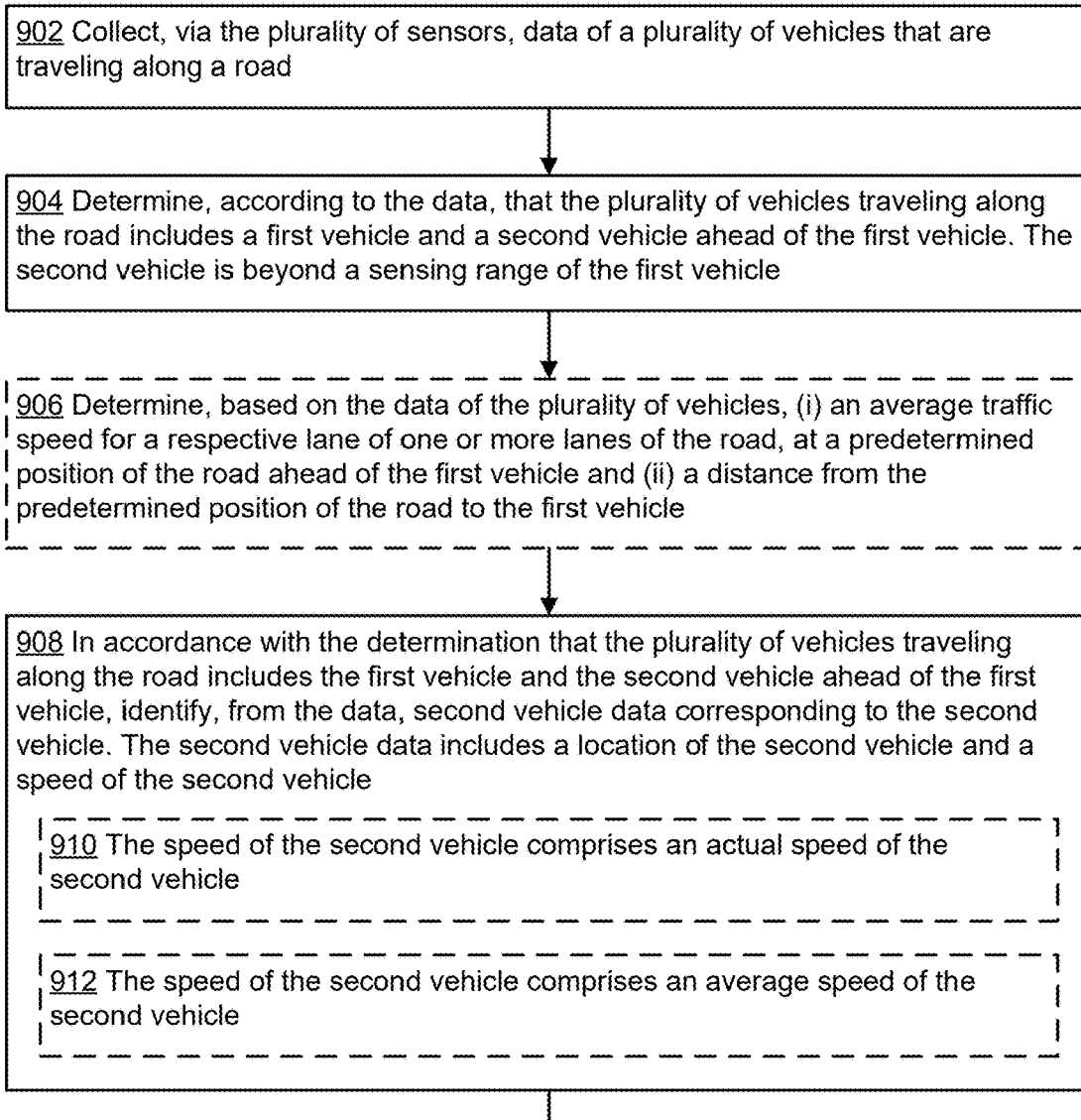

FIG. 8 is an example schematic plan view image 800 of a road 802 having a plurality of lanes (e.g., lanes 804-1, 804-2, and 804-3) and an installation 130, in accordance with some embodiments. In some embodiments, the CPU(s) 602 can determine, via the sensors 660 on the installation 130, (i) a speed v1 (812) of the vehicle 102-1, a distance D1 (822) of the vehicle 102-1 to a predetermined position 810 on the road 802, and/or a position P1 (832) of the vehicle 102-1 on the road 802; (ii) a speed v2 (814) of the vehicle 102-2, a distance D2 (824) of the vehicle 102-2 to the predetermined position 810, and/or a position P2 (834) of the vehicle 102-2; (iii) a speed v3 (816) of the vehicle 102-3, a distance D3 (826) of the vehicle 102-3 to the predetermined position 810, and/or a position P3 (836) of the vehicle 102-3; and (iv) a speed v4 (818) of the vehicle 102-4, a distance D4 (828) of the vehicle 102-4 to the predetermined position 810, and/or a position P4 (838) of the vehicle 102-4. In some embodiments, the CPU(s) 602 transmits to a respective vehicle 102 (e.g., vehicle 102-1) information regarding respective speeds, distances, and/or locations of other vehicles (e.g., vehicles 102-2, 102-3, and 102-4) traveling on the same road (e.g., on the same lane or a different lane) as the respective vehicle 102.

FIGS. 9A to 9D provide a flowchart of an example process for planning vehicle motion, in accordance with some embodiments. The method 900 is performed at a computer system (e.g., computer system 600) that includes a plurality of sensors (e.g., sensors 660) positioned on a fixed installation (e.g., installation 130) at a road. In some embodiments, the plurality of sensors includes one or more of: a global positioning system (GPS) (e.g., GPS 662), a thermal sensor (e.g., temperature sensor) (e.g., thermal sensors 674), a light detection and ranging (LiDAR) scanner (e.g., LiDAR 664), one or more cameras (e.g., cameras 666), a radio detection and ranging (RADAR) sensor (e.g., Radar 668), an infrared sensor (e.g., infrared sensors 670), and one or more ultrasonic sensors (e.g., ultrasonic sensors 672).

In some embodiments, the computer system is physically co-located at the fixed installation and the processing is performed locally at the fixed installation. In some embodiments, the computer system is located remotely from and communicatively coupled to the fixed installation. In some embodiments, the computer system includes one or more (e.g., at least one or at least two) distinct systems located at distinct locations of the road. In one example, there may be multiple systems along the same road, each system including an installation having its own respective sensors 660 and/or processing capabilities. In another example, multiple systems may be located at different roads. For instance, a first system may be located at an on-ramp segment of a freeway and a second system may be located at a road junction; or a first system may be located at a toll booth in a first city and a second system may be located at another toll booth in a second city.

The computer system includes one or more processors (e.g., CPU(s) 602) and memory (e.g., memory 606). In some embodiments, the memory stores one or more programs or instructions configured for execution by the one or more processors. In some embodiments, the operations shown in FIGS. 1, 2, 4, 5A, 5B, 6, 7, and 8 correspond to instructions stored in the memory or other non-transitory computer-readable storage medium. The computer-readable storage medium may include a magnetic or optical disk storage device, solid state storage devices such as Flash memory, or other non-volatile memory device or devices. In some embodiments, the instructions stored on the computer-readable storage medium include one or more of: source code, assembly language code, object code, or other instruction format that is interpreted by one or more processors. Some operations in the method 900 may be combined and/or the order of some operations may be changed.

The computer system collects (902) (e.g., obtains or receives), via the plurality of sensors (e.g., sensors 660), data of a plurality of vehicles that are traveling along a road. In some embodiments, the computer system collects the data of the plurality of vehicles that are traveling along the road in real time or near-real time.

The computer system determines (904) (e.g., in real time or near real time, such as within 0.5 seconds or within 1 second), according to the data, that the plurality of vehicles traveling along the road includes a first vehicle (e.g., an ego vehicle) (e.g., vehicle 102-A in FIG. 7 or vehicle 102-*a* in FIG. 8) and a second vehicle (e.g., vehicle 102-F in FIG. 7 or vehicle 104-3 in FIG. 8) ahead of the first vehicle. The second vehicle is beyond a sensing range of the first vehicle. For example, the second vehicle can be 500 meters, 1 km, 2 km, or 5 km ahead of the first vehicle.

In some embodiments, the computer system determines (906), based on the data of the plurality of vehicles: (i) an average traffic speed for a respective lane of one or more lanes of the road, at (e.g., for) a predetermined position of the road (e.g., a fixed point or a fixed location on the road, such as position 810) ahead of the first vehicle; and (ii) a distance from the predetermined position of the road to the first vehicle.

The computer system, in accordance with the determination that the plurality of vehicles traveling along the road includes the first vehicle and the second vehicle ahead of the first vehicle, identifies (908) from the data second vehicle data corresponding to the second vehicle. The second vehicle data includes a location of the second vehicle (e.g., P4 (838) of vehicle 102-4) and a speed of the second vehicle (e.g., V4 (818) of vehicle 102-4).

In some embodiments, the speed of the second vehicle includes (910) an actual speed (e.g., real speed or absolute speed) of the second vehicle.

In some embodiments, the speed of the second vehicle includes (912) an average speed of the second vehicle (e.g., averaged over the time duration that the second vehicle is in a detection range of the sensors 660).

Referring to FIG. 9B, the computer system transmits (914) the second vehicle data to the first vehicle. For example, some embodiments, the computer system transmits the second vehicle data to the first vehicle in real time, near real time (e.g., within 0.5 second or within 1 second of identification of the second vehicle data), or at runtime. The first vehicle is enabled to at least partially autonomously drive in accordance with the second vehicle data and additional data collected by one or more first sensors (e.g., sensors 260) located onboard the first vehicle. In some embodiments disclosed herein, the plurality of sensors (e.g., sensors 660) that are positioned on the fixed installation have a sensing range that is beyond a sensing range of the one or more first sensors located onboard the first vehicle.

In some embodiments, the first vehicle is configured (916) to determine a distance (e.g., an absolute distance) between the first vehicle and the second vehicle based on the second vehicle data and at least partially autonomously drive in accordance with the determined distance.

As one example, the computer system determines a location of the second vehicle (e.g., using GPS 662) and transmits to the first vehicle the location of the second vehicle. The first vehicle determines its own location (e.g., using GPS 262), and determines a distance between itself and the second vehicle based on the location information.

As a second example, the computer system can determine a location of the first vehicle and the second vehicle using GPS 662, and transmits the location information to the first vehicle. The first vehicle determines a distance between itself and the second vehicle based on the location information it receives from the computer system.

As a third example, the computer system determines a distance (e.g., distance D1 (822)) between the first vehicle (e.g., vehicle 102-1) and a fixed point (e.g., 810) on the road and determines a distance (e.g., distance D4 (828)) between the second vehicle (e.g., vehicle 102-4) and the fixed point. The computer system transmits to the first vehicle the information regarding (a) the distance between the first vehicle and the fixed point and (b) the distance between the second vehicle and the fixed point. The first vehicle determines a distance between itself and the second vehicle by taking the difference between (a) and (b).

In accordance with some embodiments, with the use of the accurate and real-time traffic information provided by the road installation 130 along a predetermined route of the first vehicle, the first vehicle is capable of not only planning for a better speed profile in a short time/distance range, but also extending the planning horizon to mid-range like a few hundred meters to several kilometers. It can also facilitate proactive lane changing or merging way ahead of the congested point. The planned vehicle motions can enhance driving safety, efficiency and comfort for individual autonomous vehicles. It can also improve overall traffic flow efficiency by smoothing the traffic speed, or through other measures such as suggested rerouting.

Referring again to FIG. 9B, in some embodiments, the computer system determines (918), according to the data of the plurality of vehicles, a distance (e.g., absolute distance) between the first vehicle and the second vehicle (See examples above). The computer system transmits information about the distance between the first vehicle and the second vehicle.

For example, the sensors of the fixed installation can include a camera (e.g., camera 666) that has a field of view that is much further than the first vehicle (e.g., the camera can detect the first vehicle as well as the second vehicle which may be a mile or kilometer away from the first vehicle. The computer system determines the distance between the second vehicle and the first vehicle, and transmits information about the distance as well as the speed of the second vehicle.

In some embodiments, the computer system transmits (920) the information about the distance between the first vehicle and the second vehicle and the speed of the second vehicle as a first (s, v) pair, where s represents the distance between the first vehicle and the second vehicle and v represents the speed of the second vehicle.

In some embodiments, the first (s, v) pair is associated (922) with a first timestamp. The computer system determines a series (e.g., at least two) of (s, v) pairs to establish respective distances between the first vehicle and the second vehicle and respective speeds of the second vehicle over a time period. Each (s, v) pair in the series has a respective timestamp.

With continued reference to FIG. 9C, in some embodiments, the computer system transmits (924) an average traffic speed and the distance to the first vehicle such that the first vehicle is configured to at least partially autonomously drive in a first trajectory (e.g., according to a longitudinal speed profile) in accordance with the average traffic speed and the distance. For example, by transmitting the average speed to the first vehicle, the first vehicle can have a rough idea of how traffic look like over an extended range that is beyond the sensing capabilities of the first vehicle. In some instances, an average traffic speed along the road may be decreasing at a distance beyond the sensing range of the first vehicle (e.g., due to traffic buildup). Having knowledge of the average vehicle speed enables the first vehicle to reduce a current upper bound of the target speed to prepare for the traffic ahead. This is especially useful in the case where the first vehicle is a heavy-duty truck that requires longer braking distance. Thus, safety and fuel efficiency are improved.

In some embodiments, the computer system transmits (926) the average traffic speed and the distance to the first vehicle as a first (s_1, v_1) pair, wherein s_1 represents the distance from the predetermined position of the road to the first vehicle and v_1 represents the average traffic speed for the respective lane at the predetermined position of the road. In some embodiments, the first vehicle is configured to at least partially autonomously drive according to a longitudinal speed profile that is generated by an autonomous vehicle driving model of the first vehicle. In some embodiments, the autonomous vehicle driving model of the first vehicle is configured to use the first (s,v) pair as a target speed or constraint when determining the longitudinal speed profile. The distance refers to the distance along the route, which can include multiple lanes connecting the two vehicles. In some embodiments, the distance is not a straight line between the two vehicles.

In some embodiments, the first vehicle is configured (928) to autonomously drive according to first data from the first (s_1, v_1) pair and second data from other (s_i, v_i) pairs that are generated (e.g., calculated or determined) based on the additional data collected by the one or more first sensors of the first vehicle. s_i represents a distance from the first vehicle to an $i^{th}$ object (e.g., determined from data collected by the one or more first sensors of the first vehicle), and v_i represents a relative speed between the first vehicle and the $i^{th}$ object (e.g., determined from data collected by the one or more first sensors of the first vehicle). Typically, an (s_i, v_i) pair is calculated by the first vehicle (e.g., an ego vehicle) for every other obstacle vehicle as the distance from the first vehicle to that obstacle vehicle, and the relative speed between the first vehicle and that obstacle vehicle.

In some embodiments, prior to transmitting the average traffic speed to the first vehicle, the computer system converts (930) a reference frame of the average vehicle speed from a first reference frame corresponding to the fixed installation to a second reference frame corresponding to the first vehicle.

For example, in some embodiments, the additional data collected by the one or more first sensors of the first vehicle include data of one or more other vehicles that are within a detection range of the one or more sensors, including (a) respective distances between the one or more other vehicles and the first vehicle, (b) respective speeds of the one or more other vehicles, and (c) respective locations of the one or more other vehicles. In some embodiments, the first vehicle is configured to generate other (s, v) pairs, wherein the s in a respective other (s, v) pair represents the distance between the first vehicle and a respective other vehicle and the v in a respective other (s, v) pair represents a relative speed of the respective other vehicle relative to the speed of the first vehicle. Because the sensors 660 are stationary, the speed of the second vehicle as detected by the sensors 660 represents an absolute speed whereas the speed of the other vehicles as detected by the onboard sensors of the first vehicle are relative speeds, in some embodiments, the computer system converts a reference frame of the average vehicle speed from a first reference frame corresponding to the fixed installation to a second reference frame corresponding to the first vehicle by subtracting the speed of the first vehicle from the speed of the second vehicle so that the common reference frame are based on relative velocities. In some embodiments, the computer system provides the speed of the second vehicle (e.g., an absolute speed) to the first vehicle, and a data processing module 238 of the first vehicle converts the speed of the second vehicle from the fixed frame (e.g., coordinate system) of the installation to a vehicle frame.

Referring to FIG. 9D, in some embodiments, the road includes a plurality of lanes (e.g., lanes 804-1, 804-2, and 804-3). The computer system determines (932) an average traffic speed for each lane, of the plurality of lanes, at (e.g., for) a predetermined position of the road (e.g., a fixed point or a fixed location of the road, such as position 810) ahead of the first vehicle; determines a distance from the predetermined position of the road to the first vehicle; and transmits to the first vehicle (i) a plurality of average traffic speeds, corresponding to the plurality of lanes, and (ii) the distance from the predetermined position of the road to the first vehicle.

In accordance with some embodiments, the vehicle motion planning can depend on lane-level traffic speed. In some instances, s is mostly the same across all lanes as long as the lanes are always adjacent to each other from host vehicle to object vehicle. For example, the computer system may transmit multiple (s,v) pairs to the first vehicle (e.g., (s, v1), (s, v2), (s, v3) etc.), where it is the same "s" but different "v's", depending on the average speed of the vehicles of a respective lane.

In some embodiments, the computer system transmits (934) to the first vehicle the plurality of average traffic speeds and the distance from the predetermined position of the road to the first vehicle as (s, v_i) pairs. s represents the distance from the predetermined position of the road to the first vehicle, and v_i represents the average traffic speed for an $i^{th}$ lane of the plurality of lanes. In some embodiments, the first vehicle is configured to activate lateral motion planning (e.g., proactively switching lanes) if the (s, v)

profile of the current lane in which the first vehicle is driving diverges too much from the (s, v) profile of an adjacent lane.

In some embodiments, the first vehicle is configured (936) to at least partially autonomously drive by switching from an ego lane to a lane adjacent to the ego lane in accordance with a determination that a difference between a first average speed corresponding to the ego lane and a second average speed corresponding to the lane adjacent to the ego lane satisfies (e.g., greater than, greater than or equal to) a first threshold. For example, in some embodiments, the first vehicle may switch to another lane when the difference in average lane speed meets or exceeds a threshold.

In some embodiments, the computer system generates (938) a spatial representation representing traffic density on the road in accordance with the collected data, and transmits the spatial representation to the first vehicle. For example, the spatial representation representing the traffic density can be a two-dimensional map, a three-dimensional map, or a heat map. In some embodiments, the first vehicle is configured to at least partially autonomously drives in accordance with the spatial representation).

In some embodiments, the computer system generates (940), based at least in part on the data of the plurality of vehicles, one or more time series of traffic speed data of one or more lanes of the road corresponding to (e.g., for) a predetermined position (e.g., a fixed point or a fixed location) of the road ahead of the first vehicle.

Turning on to some example embodiments:

(A1) In accordance with some embodiments, a method for planning vehicle motion is performed at a computer system that is associated with (e.g., includes) a plurality of sensors that are positioned on a fixed installation at a road. The computer system includes one or more processors, and memory. The method includes: (i) collecting, via the plurality of sensors, data of a plurality of vehicles that are traveling along a road; (ii) determining, according to the data, that the plurality of vehicles traveling along the road includes a first vehicle and a second vehicle ahead of the first vehicle, where the second vehicle is beyond a sensing range of the first vehicle; and (iii) in accordance with the determination: (a) identifying, from the data, second vehicle data corresponding to the second vehicle, the second vehicle data including a location of the second vehicle and a speed of the second vehicle; and (b) transmitting the second vehicle data to the first vehicle such that the first vehicle is enabled to at least partially autonomously drive in accordance with the second vehicle data and additional data collected by one or more first sensors of the first vehicle.

(A2) In some embodiments of A1, the method includes determining, according to the data of the plurality of vehicles, a distance between the first vehicle and the second vehicle. Transmitting the second vehicle data to the first vehicle includes transmitting information about the distance between the first vehicle and the second vehicle.

(A3) In some embodiments of A2, transmitting the second vehicle data to the first vehicle includes transmitting the information about the distance between the first vehicle and the second vehicle and the speed of the second vehicle as a first (s, v) pair, where s represents the distance between the first vehicle and the second vehicle and v represents the speed of the second vehicle.

(A4) In some embodiments of A3, the first (s, v) pair is associated with a first timestamp. The method further comprises determining a series of (s, v) pairs to establish respective distances between the first vehicle and the second vehicle and respective speeds of the second vehicle over a time period, wherein each (s, v) pair in the series has a respective timestamp.

(A5) In some embodiments of any of A1-A4, the first vehicle is configured to determine a distance between the first vehicle and the second vehicle based on the second vehicle data and at least partially autonomously drive in accordance with the determined distance.

(A6) In some embodiments of any of A1-A5, the speed of the second vehicle comprises an actual speed of the second vehicle.

(A7) In some embodiments of any of A1-A6, the speed of the second vehicle comprises an average speed of the second vehicle.

(A8) In some embodiments of any of A1-A7, the method includes (i) determining, based on the data of the plurality of vehicles, (a) an average traffic speed for a respective lane of one or more lanes of the road, at a predetermined position of the road ahead of the first vehicle and (b) a distance from the predetermined position of the road to the first vehicle; and (ii) transmitting the average traffic speed and the distance to the first vehicle. The first vehicle is configured to at least partially autonomously drive in a first trajectory in accordance with the average traffic speed and the distance.

(A9) In some embodiments of A8, the method includes prior to transmitting the average traffic speed to the first vehicle, converting a reference frame of the average vehicle speed from a first reference frame corresponding to the fixed installation to a second reference frame corresponding to the first vehicle.

(A10) In some embodiments of A8 or A9, the average traffic speed and the distance are transmitted to the first vehicle as a first (s_1, v_1) pair, wherein s_1 represents the distance from the predetermined position of the road to the first vehicle and v_1 represents the average traffic speed for the respective lane at the predetermined position of the road.

(A11) In some embodiments of A10, the first vehicle is configured to autonomously drive according to first data from the first (s_1, v_1) pair and second data from other (s_i, v_i) pairs that are generated based on the additional data collected by the one or more first sensors of the first vehicle, where s_i represents a distance from the first vehicle to an $i^{th}$ object, and v_i represents a relative speed between the first vehicle and the $i^{th}$ object.

(A12) In some embodiments of any of A1-A11, the road includes a plurality of lanes. The method includes (i) determining an average traffic speed for each lane, of the plurality of lanes, at a predetermined position of the road ahead of the first vehicle; (ii) determining a distance from the predetermined position of the road to the first vehicle; and (iii) transmitting to the first vehicle (a) a plurality of average traffic speeds, corresponding to the plurality of lanes, and (b) the distance from the predetermined position of the road to the first vehicle.

(A13) In some embodiments of A12, the first vehicle is configured to at least partially autonomously drive by switching from an ego lane to a lane adjacent to the ego lane in accordance with a determination that a difference between a first average speed corresponding to the ego lane and a second average speed corresponding to the lane adjacent to the ego lane satisfies a first threshold.

(A14) In some embodiments of A12 or A14, the method includes transmitting to the first vehicle the plurality of average traffic speeds and the distance from the predetermined position of the road to the first vehicle as (s, v_i) pairs, where s represents the distance from the predetermined position of the road to the first vehicle, and v_i represents the average traffic speed for an $i^{th}$ lane of the plurality of lanes.

(A15) In some embodiments of any of A1-A14, the method includes (i) generating a spatial representation representing traffic density on the road in accordance with the collected data and (ii) transmitting the spatial representation to the first vehicle.

(A16) In some embodiments of any of A1-A15, the method includes generating, based at least in part on the data of the plurality of vehicles, one or more time series of traffic speed data of one or more lanes of the road corresponding to a predetermined position of the road ahead of the first vehicle.

(A17) In some embodiments of any of A1-A16, the plurality of sensors includes one or more of: a global positioning system (GPS), a thermal sensor, a light detection and ranging (LiDAR) scanner, one or more cameras, a radio detection and ranging (RADAR) sensor, an infrared sensor, and one or more ultrasonic sensors.

(B1) In accordance with some embodiments, a computer system is associated with a fixed installation having a plurality of sensors. The computer system comprises one or more processors and memory coupled to the one or more processors. The memory stores instructions that, when executed by the one or more processors, cause the computer system to perform the method of any of A1-A17.

(C1) In accordance with some embodiments, a non-transitory computer-readable storage medium stores instructions that, when executed by one or more processors of computer system that is associated with a fixed installation having a plurality of sensors, cause the computer system to perform the method of any of A1-A17.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

As used herein, the phrase "based on" does not mean "based only on," unless expressly specified otherwise. In other words, the phrase "based on" describes both "based only on" and "based at least on."

As used herein, the term "exemplary" means "serving as an example, instance, or illustration," and does not necessarily indicate any preference or superiority of the example over any other configurations or implementations.

As used herein, the term "and/or" encompasses any combination of listed elements. For example, "A, B, and/or C" includes the following sets of elements: A only, B only, C only, A and B without C, A and C without B, B and C without A, and a combination of all three elements, A, B, and C.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for planning vehicle motion, comprising:
   at a computer system that is associated with a plurality of sensors that are positioned on a fixed installation at a road, one or more processors, and memory:
     collecting, via the plurality of sensors, data of a plurality of vehicles that are traveling along the road;
     determining, according to the data, that the plurality of vehicles traveling along the road includes a first vehicle and a second vehicle ahead of the first vehicle, wherein the second vehicle is beyond a sensing range of the first vehicle; and
   in accordance with the determination:
     identifying, from the data, second vehicle data corresponding to the second vehicle, the second vehicle data including a location of the second vehicle and a speed of the second vehicle;
     determining a distance between the first vehicle and the second vehicle based on the second vehicle data; and
     transmitting the second vehicle data to the first vehicle as one or more ordered pairs of (s,v) coordinates, wherein s represents the distance between the first vehicle and the second vehicle and y represents the speed of the second vehicle, such that the first vehicle is enabled to at least partially autonomously drive in accordance with the second vehicle data and additional data collected by one or more first sensors of the first vehicle.

2. The method of claim 1, wherein:
   the one or more ordered pairs of (s,v) coordinates include a first (s, v) pair associated with a first timestamp; and
   the method further comprises determining a series of ordered pairs of (s, v) coordinates to establish respective distances between the first vehicle and the second vehicle and respective speeds of the second vehicle over a time period, wherein each ordered pair of (s, v) coordinates in the series has a respective timestamp.

3. The method of claim 1, wherein the first vehicle is configured to determine a distance between the first vehicle and the second vehicle based on the second vehicle data and at least partially autonomously drive in accordance with the determined distance.

4. The method of claim 1, wherein the speed of the second vehicle comprises an actual speed of the second vehicle.

5. The method of claim 1, wherein the speed of the second vehicle comprises an average speed of the second vehicle.

6. The method of claim 1, further comprising:
   determining, based on the data of the plurality of vehicles:

an average traffic speed for a respective lane of one or more lanes of the road, at a predetermined position of the road ahead of the first vehicle; and
a distance from the predetermined position of the road to the first vehicle; and
transmitting the average traffic speed and the distance to the first vehicle, wherein the first vehicle is configured to at least partially autonomously drive in a first trajectory in accordance with the average traffic speed and the distance.

7. The method of claim 6, further comprising:
prior to transmitting the average traffic speed to the first vehicle, converting a reference frame of the average vehicle speed from a first reference frame corresponding to the fixed installation to a second reference frame corresponding to the first vehicle.

8. The method of claim 6, wherein the average traffic speed and the distance are transmitted to the first vehicle as a first ordered pair of (s_1, v_1) coordinates, wherein s_1 represents the distance from the predetermined position of the road to the first vehicle and v_1 represents the average traffic speed for the respective lane at the predetermined position of the road.

9. The method of claim 8, wherein the first vehicle is configured to autonomously drive according to first data from the first ordered pair of (s_1, v_1) coordinates and second data from other ordered pairs of (s_i, v_i) coordinates that are generated based on the additional data collected by the one or more first sensors of the first vehicle, wherein s_i represents a distance from the first vehicle to an $i^{th}$ object, and v_i represents a relative speed between the first vehicle and the $i^{th}$ object.

10. The method of claim 1, wherein:
the road includes a plurality of lanes; and
the method further comprises:
determining an average traffic speed for each lane, of the plurality of lanes, at a predetermined position of the road ahead of the first vehicle;
determining a distance from the predetermined position of the road to the first vehicle; and
transmitting to the first vehicle (i) a plurality of average traffic speeds, corresponding to the plurality of lanes, and (ii) the distance from the predetermined position of the road to the first vehicle.

11. The method of claim 10, wherein the first vehicle is configured to at least partially autonomously drive by switching from an ego lane to a lane adjacent to the ego lane in accordance with a determination that a difference between a first average speed corresponding to the ego lane and a second average speed corresponding to the lane adjacent to the ego lane satisfies a first threshold.

12. The method of claim 10, further comprising transmitting to the first vehicle the plurality of average traffic speeds and the distance from the predetermined position of the road to the first vehicle as ordered pairs of (s, v_i) coordinates, wherein s represents the distance from the predetermined position of the road to the first vehicle, and v_i represents the average traffic speed for an $i^{th}$ lane of the plurality of lanes.

13. A computer system associated with a fixed installation at a road, the fixed installation having a plurality of sensors that are positioned on the fixed installation, the computer system comprising:
one or more processors; and
memory coupled to the one or more processors, the memory storing one or more programs configured for execution by the one or more processors, the one or more programs including instructions for:
collecting, via the plurality of sensors, data of a plurality of vehicles that are traveling along the road;
determining, according to the data, that the plurality of vehicles traveling along the road includes a first vehicle and a second vehicle ahead of the first vehicle, wherein the second vehicle is beyond a sensing range of the first vehicle; and
in accordance with the determination:
identifying, from the data, second vehicle data corresponding to the second vehicle, the second vehicle data including a location of the second vehicle and a speed of the second vehicle;
determining a distance between the first vehicle and the second vehicle based on the second vehicle data; and
transmitting the second vehicle data to the first vehicle as one or more ordered pairs of (s,v) coordinates, wherein s represents the distance between the first vehicle and the second vehicle and v represents the speed of the second vehicle, such that the first vehicle is enabled to at least partially autonomously drive in accordance with the second vehicle data and additional data collected by one or more first sensors of the first vehicle.

14. The computer system of claim 13, the one or more programs including instructions for:
generating a spatial representation representing traffic density on the road in accordance with the collected data; and
transmitting the spatial representation to the first vehicle.

15. The computer system of claim 13, the one or more programs including instructions for:
generating, based at least in part on the data of the plurality of vehicles, one or more time series of traffic speed data of one or more lanes of the road corresponding to a predetermined position of the road ahead of the first vehicle.

16. The computer system of claim 13, wherein the plurality of sensors includes one or more of: a global positioning system (GPS), a thermal sensor, a light detection and ranging (LiDAR) scanner, one or more cameras, a radio detection and ranging (RADAR) sensor, an infrared sensor, and one or more ultrasonic sensors.

17. A non-transitory computer-readable storage medium storing one or more programs configured for execution by one or more processors of a computer system, wherein the computer system is associated with a fixed installation at a road, the fixed installation having a plurality of sensors that are positioned on the fixed installation, the one or more programs comprising instructions for:
collecting, via the plurality of sensors, data of a plurality of vehicles that are traveling along the road;
determining, according to the data, that the plurality of vehicles traveling along the road includes a first vehicle and a second vehicle ahead of the first vehicle, wherein the second vehicle is beyond a sensing range of the first vehicle; and
in accordance with the determination:
identifying, from the data, second vehicle data corresponding to the second vehicle, the second vehicle data including a location of the second vehicle and a speed of the second vehicle;
determining a distance between the first vehicle and the second vehicle based on the second vehicle data; and transmitting the second vehicle data to the first vehicle as one or more ordered pairs of (s,v) coordinates, wherein s represents the distance between the first vehicle and the second vehicle and v represents the speed of the second vehicle, such that the first vehicle is enabled to at least partially autonomously drive in accordance with the second vehicle data and additional data collected by one or more first sensors of the first vehicle.

18. The non-transitory computer-readable storage medium of claim 17, wherein the speed of the second vehicle comprises an actual speed of the second vehicle or an average speed of the second vehicle.

19. The non-transitory computer-readable storage medium of claim 17, wherein the first vehicle is configured to determine a distance between the first vehicle and the second vehicle based on the second vehicle data and at least partially autonomously drive in accordance with the determined distance.

20. The non-transitory computer-readable storage medium of claim 17, wherein the speed of the second vehicle comprises one of an actual speed of the second vehicle and an average speed of the second vehicle.

\* \* \* \* \*